United States Patent
Ku et al.

(10) Patent No.: US 11,420,334 B2
(45) Date of Patent: Aug. 23, 2022

(54) CANDIDATE SIX DIMENSIONAL POSE HYPOTHESIS SELECTION

(71) Applicant: Hong Kong Applied Science and Technology Research Institute Co., Ltd., Shatin (HK)

(72) Inventors: Wing To Ku, Tai Po (HK); Wenguan Wang, Shatin (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 379 days.

(21) Appl. No.: 16/848,460

(22) Filed: Apr. 14, 2020

(65) Prior Publication Data
US 2021/0316463 A1    Oct. 14, 2021

(51) Int. Cl.
*B25J 9/16* (2006.01)
*G06T 17/00* (2006.01)
*G06T 7/73* (2017.01)

(52) U.S. Cl.
CPC ........... *B25J 9/1697* (2013.01); *B25J 9/1669* (2013.01); *G06T 7/75* (2017.01); *G06T 17/00* (2013.01)

(58) Field of Classification Search
CPC ....................................................... G06T 7/75
See application file for complete search history.

(56) References Cited

U.S. PATENT DOCUMENTS

| | | | |
|---|---|---|---|
| 8,830,229 B2 | 9/2014 | Drost et al. | |
| 8,908,913 B2 | 12/2014 | Taguchi et al. | |
| 10,217,277 B2 | 2/2019 | Robert et al. | |
| 2013/0156262 A1* | 6/2013 | Taguchi | G06T 7/75 |
| | | | 382/103 |
| 2015/0243035 A1* | 8/2015 | Narasimha | G06T 7/344 |
| | | | 382/154 |

FOREIGN PATENT DOCUMENTS

| | | |
|---|---|---|
| CN | 103971409 A | 8/2014 |
| CN | 105956074 A | 9/2016 |
| CN | 106780576 A | 5/2017 |
| CN | 108876852 A | 11/2018 |
| CN | 109816704 A | 5/2019 |

OTHER PUBLICATIONS

Patent Cooperation Treaty, International Search Report and Written Opinion Issued for PCT Application No. PCT/CN2020/086488, dated Jan. 12, 2021, 10 pages.

* cited by examiner

*Primary Examiner* — Shivang I Patel
(74) *Attorney, Agent, or Firm* — Norton Rose Fulbright US LLP

(57) ABSTRACT

The present disclosure relates to methods, devices, and systems for selecting a candidate six dimensional pose hypothesis from among a plurality of six dimensional pose hypotheses. For example, the systems, devices, and methods described herein may be used to quickly, accurately, and precisely select a candidate six dimensional pose hypothesis from among a plurality of six dimensional pose hypotheses so that the selected candidate six dimensional pose hypothesis substantially overlaps with an image of an object to be identified from an image of a plurality of objects. In this manner, an object can be identified from among a plurality of objects based on the selected candidate six dimensional pose hypothesis.

20 Claims, 11 Drawing Sheets

FROM FIG. 2A-1
FROM FIG. 2B-1
210 — Filter the target 3D representation of the particular object into model 3D point cloud data
210A 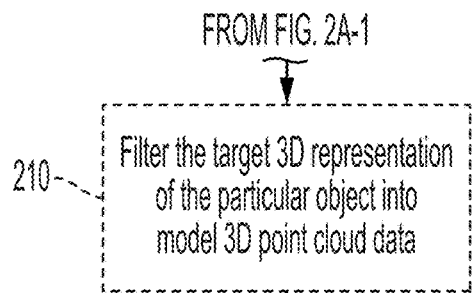
212 — Partition the filtered target 3D point cloud data and assign a partition number
212A 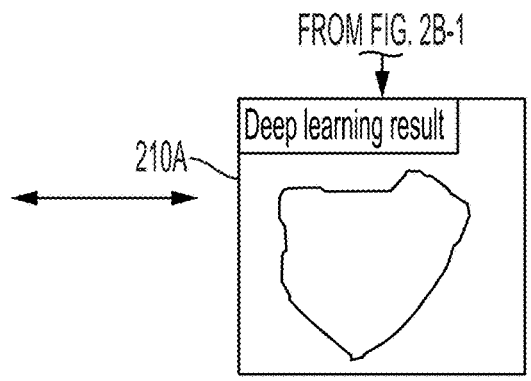
214 — Generate a plurality of 6D pose hypotheses
214A 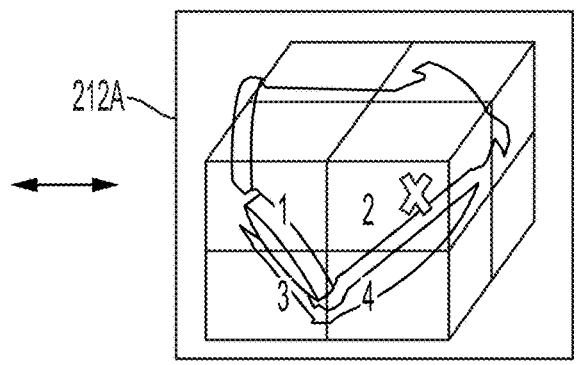
216 — Select the candidate 6D pose hypothesis from the plurality of 6D pose hypotheses
216A 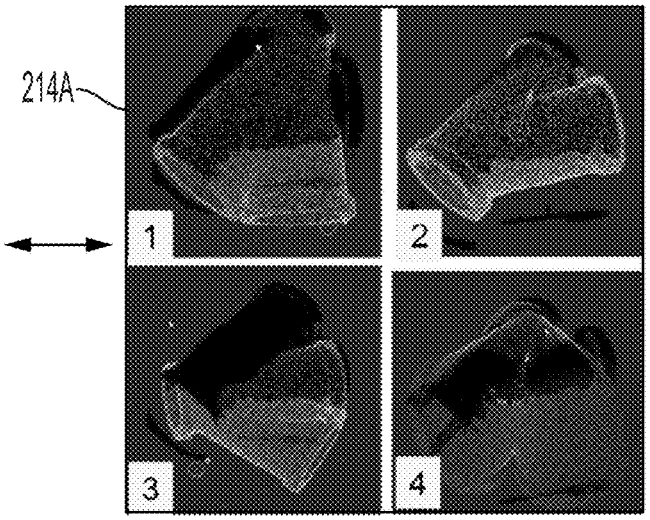
FIG. 2A-2
FIG. 2B-2

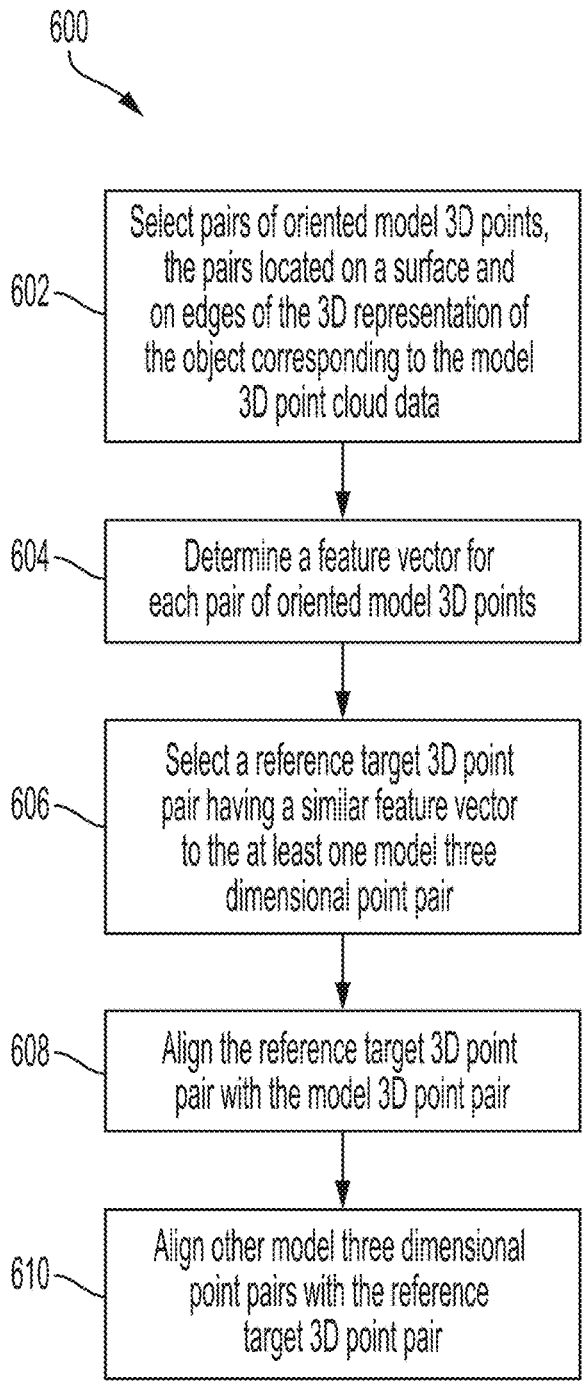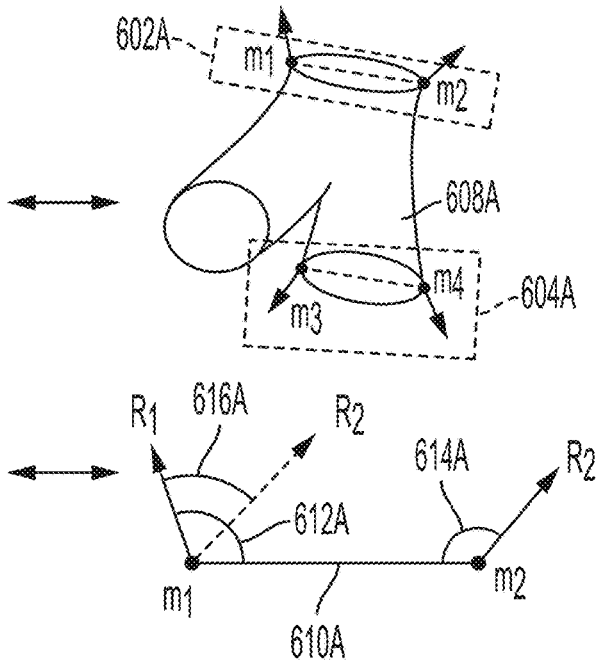
FIG. 6B
FIG. 6A

CANDIDATE SIX DIMENSIONAL POSE HYPOTHESIS SELECTION

TECHNICAL FIELD

The present disclosure relates to object identification and specifically to identifying an object based on a six dimensional pose hypothesis selected from among a plurality of six dimensional pose hypotheses.

BACKGROUND

Human beings are able to quickly, accurately, and precisely identify a desired object from among a plurality of objects and then grab the desired object, seemingly without difficulty. The precise means by which this routine activity is performed are not well understood. Replicating, in a machine vision system, the speed, accuracy, and precision with which humans are able to identity objects is challenging.

In a machine vision system, an imaging device, such as camera or scanner generates an image of a plurality of objects from which a particular object is to be identified. The machine vision system may include a database of three dimensional representations of objects that the machine is likely to commonly encounter. For instance, if a machine vision system is incorporated into a robot and if the robot is deployed in an automobile factory, the machine vision system is likely to encounter automobile parts, such as doors, springs, gears, and pipes. Thus, such a machine vision system might include in its memory a three dimensional representation of a pipe.

The machine vision system (e.g., under control of a processor of the machine vision system) will attempt to match the three dimensional representation of the object against the image of the particular object to be identified. However, a difficulty associated with such matching is that the particular object to be selected might be positioned (e.g., be located at a particular position along axes of a Cartesian coordinate system) and oriented (e.g., have particular Euler angles specified within the Cartesian coordinate system) randomly in a bin of similarly sized and shaped objects. Further, a known coordinate system of an imaging device of the machine vision system might be different from the coordinate system of the object to be identified, thereby necessitating a transform from the coordinate system of the object into the coordinate system of the imaging device. Thus, to accurately match the image of the particular object against the three dimensional representation of the object, the machine vision system may generate different positions and orientations of the three dimensional representation of the object. These different positions and orientations of the three dimensional representation of the object are commonly referred to as six dimensional pose hypotheses.

A machine vision system might generate hundreds of thousands of six dimensional pose hypotheses, and the machine vision system might try to match each six dimensional pose hypothesis against the image of the particular object to be identified. Although this brute force approach may eventually lead to a correct match between a six dimensional pose hypothesis and the image of the particular object to be identified, such a brute force approach is computationally expensive (i.e., uses significant processing time) and is typically slow, because the machine vision system sequentially tests each six dimensional pose hypothesis until a correct six dimensional pose hypothesis is identified. Slow solutions are unacceptable in most practical applications. Computationally expensive solutions also are unacceptable in most practical applications, because sufficient computational resources may not be readily available to implement these types of solutions.

SUMMARY

Due to the difficultly inherent in accurately, precisely, and quickly identifying objects with rotational symmetry or with large planar surfaces, there is a need to enhance identification of a candidate six dimensional pose hypothesis from among a plurality of six dimensional pose hypotheses without resorting to edge matching techniques or other techniques known in the art that are unable to accurately, precisely, and quickly identify such objects. The candidate six dimensional pose hypothesis corresponds to a translation and to a rotation of a three dimensional representation of an object that positions and orients the three dimensional representation of the object so that the position and orientation of the three dimensional representation of the object substantially aligns with an image of a randomly positioned and oriented object. The plurality of six dimensional pose hypotheses correspond to hypothetical translations and rotations of the three dimensional representation of the object, many of which do not substantially align with the image of the randomly positioned and oriented object.

Embodiments of the technology described herein address the problem of identifying an object from an image of a plurality of objects that includes an image of the object. In embodiments, the image may be a grayscale image with a depth image or a red green blue (rgb) image with a depth image. In accordance with embodiments, objects for which identification processing is provided may, for example, have rotational symmetry, have a large planar surface, and/or one or more other features generally problematic with respect to machine based identification processing. Solutions provided herein provide a quick, accurate, and precise identification of a candidate six dimensional pose hypothesis from among a plurality of six dimensional pose hypotheses. In accordance with embodiments, the translations and rotations corresponding to the candidate six dimensional pose hypothesis substantially correctly orient and position a three dimensional representation of an object so that a match can be established between the three dimensional representation of the object and the image of the object. In this manner, embodiments described herein can be deployed in computer vision systems to aid in the rapid, accurate, and precise identification of an object form among a plurality of objects.

Embodiments include a method for rapid identification of a candidate six dimensional pose hypothesis from among a plurality of six dimensional pose hypotheses. Model three dimensional point cloud data, extracted from a three dimensional representation of an object geometrically resembling an object to be identified from an image of a plurality of objects that includes the object, may be transformed through parallel application of a first set of six dimensional pose hypotheses selected from a plurality of six dimensional pose hypotheses.

Each six dimensional pose hypothesis of the first set of six dimensional pose hypotheses may correspond to particular translation and rotation matrices. When coordinates of the model three dimensional points of the model three dimensional point cloud data are operated on by the particular translation and rotation matrices, for example, the model three dimensional points may be translated and rotated in a coordinate system of an imaging device used to generate the image of the plurality of objects. These translated and rotated model three dimensional points comprise an instance of transformed model three dimensional point cloud data according to embodiments. Further, a plurality of transformed model three dimensional point cloud data instances are generated in parallel through the mathematical operations described herein. By parallelizing the mathematical operations, a candidate six dimensional pose hypothesis, corresponding to a position and orientation of an object to be identified can quickly be generated.

The model three dimensional point cloud data can be iteratively operated on through one or more subsequent sets of six dimensional pose hypotheses (e.g., a second set of six dimensional pose hypotheses, a third set of six dimensional pose hypotheses, and so on, as appropriate for any particular implementation) selected from the plurality of six dimensional pose hypotheses. In this manner, multiple sets of multiple instances of transformed model three dimensional point cloud data quickly can be generated. An extent of overlap can be determined between transformed model three dimensional points of the model three dimensional point cloud data and target three dimensional point cloud data, corresponding to an image of an object to be identified. A six dimensional pose hypothesis corresponding to the largest number of transformed model three dimensional points associated with an instance of transformed model three dimensional point cloud data that overlap with the target three dimensional points of the target three dimensional point cloud data may be identified as the candidate six dimensional pose hypothesis (i.e., a candidate six dimensional pose hypothesis is selected from the plurality of six dimensional pose hypotheses as being the pose hypothesis representative of the object pose within the image).

Candidate six dimensional pose hypotheses identified according to concepts of the present invention may be utilized in various applications and in a number of ways. For example, candidate six dimensional pose hypothesis data, corresponding to the candidate six dimensional pose hypothesis, may be provided to a robot for identification of an object to be identified from an image of a plurality of objects that includes the object. The robot can grasp the object to be identified based, at least in part, on the candidate six dimensional pose hypothesis data. As another example, candidate six dimensional pose hypothesis data can be used to identify a particular molecule having a particular geometry from an image of a plurality of differently oriented and positioned molecules. In this manner, drug discovery can be expedited, since the pharmacological effect of many drugs depends upon the geometry of the molecule.

The foregoing has outlined rather broadly the features and technical advantages of the present disclosure in order that the detailed description of the disclosure that follows may be better understood. Additional features and advantages of the disclosure will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE FIGURES

For a more complete understanding of the present disclosure, reference is now made to the following descriptions taken in conjunction with the accompanying drawing, in which:

FIGS. 2A-1, 2B-1, 2A-2, and 2B-2 depict an overview of an illustrative method for selecting a candidate six dimensional pose hypothesis from among a plurality of six dimensional pose hypotheses according to embodiments of the present invention;

FIGS. 6A and 6B depict an exemplary method for generating a plurality of six dimensional pose hypotheses according to embodiments of the present invention.

DETAILED DESCRIPTION OF THE INVENTION

Particular implementations of the present disclosure are described below with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

Figure 1A:
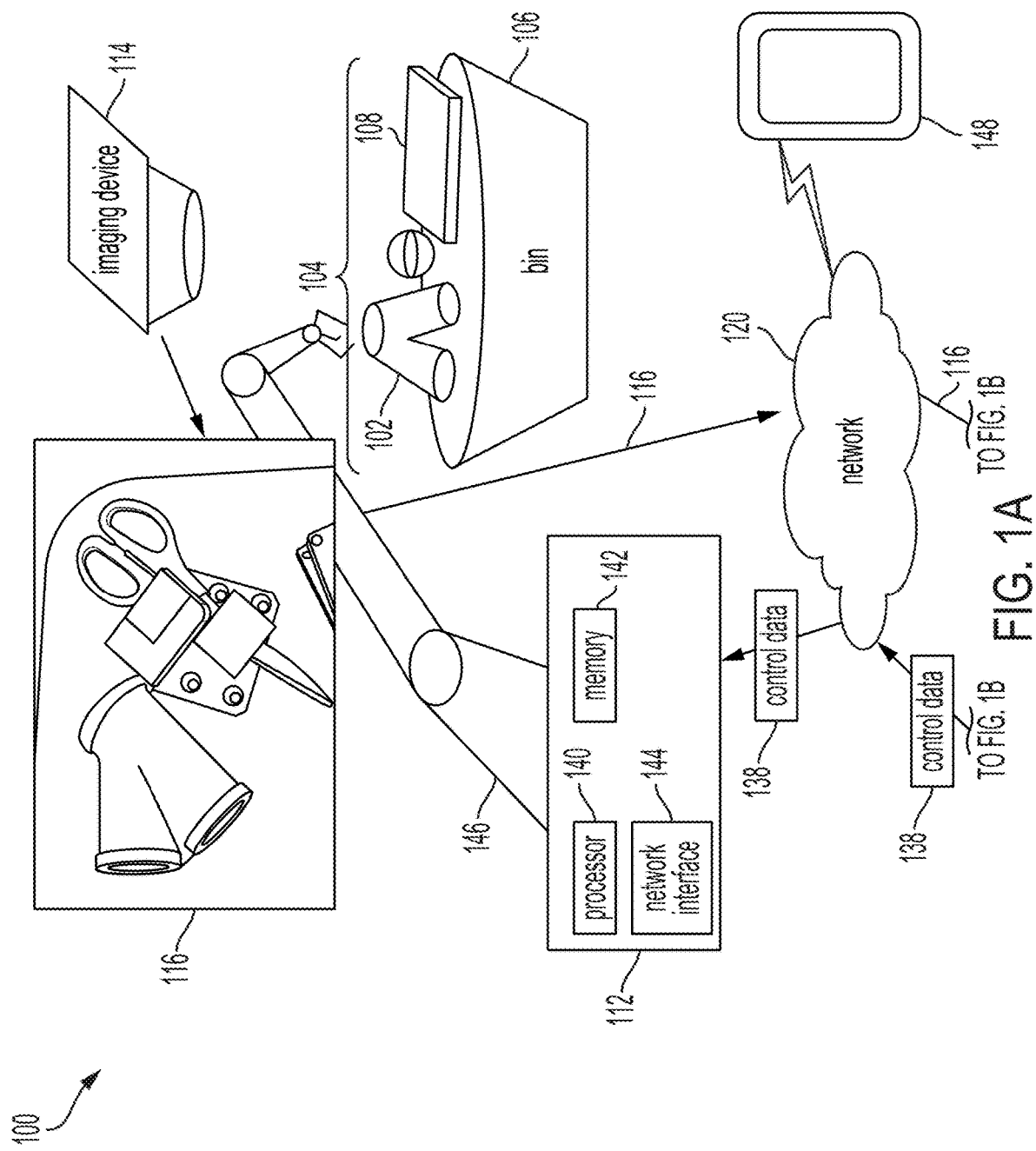
FIGS. 1A and 1B illustrate a system for identification of an object from among a plurality of objects according to embodiments of the present invention.
Figure 1B:
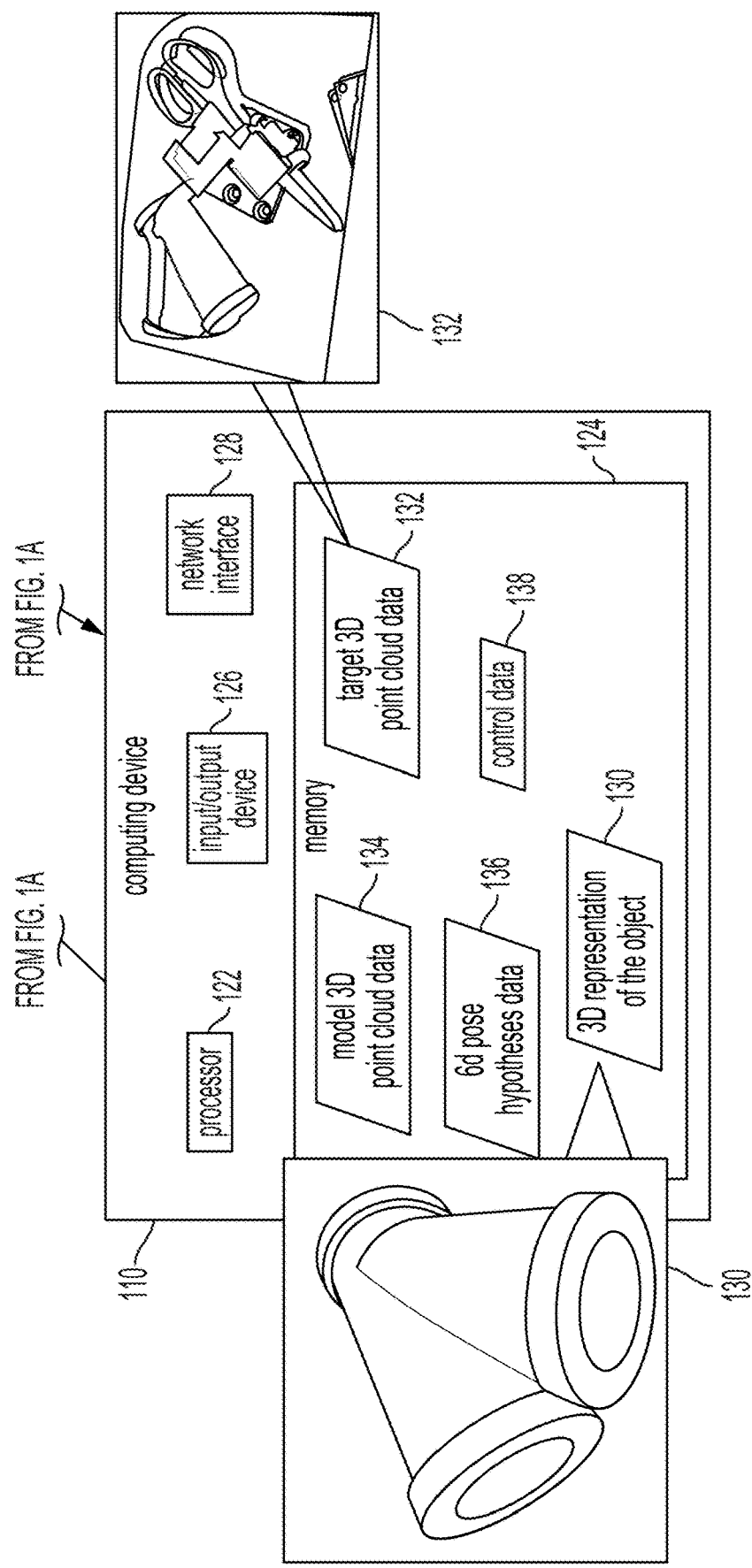

FIGS. 1A and 1B depict a system 100 configured for identification of a particular object 102 from among a plurality of objects 104 in accordance with concepts of the present invention. Implementation of system 100 according to the illustrated embodiments may, for example, be used to facilitate rapid, precise, and/or accurate object identification in a variety of scenarios. For example, system 100 may be utilized to provide identification of objects having features generally problematic with respect to machine based identification processing. In some examples, system 100 may rapidly, precisely, and accurately identify objects having rotational symmetry or large planar surfaces. However, the concepts of the disclosure are not limited to identifying such objects. In particular, embodiments implemented in accordance with concepts of the disclosure may be used to identify objects of various configurations by correctly identifying a candidate six dimensional pose hypothesis from among a plurality of six dimensional pose hypotheses, as described in detail below.

The plurality of objects 104 from which system 100 may identify a particular object may include a plurality of randomly positioned, oriented, sized and shaped objects, including one or more particular objects of interest (shown as the particular object 102), positioned in a bin 106 or otherwise disposed in intermingled fashion. In accordance with some embodiments, the particular object 102 may have a shape that lacks distinct edges, such as a shape comprised of two substantially attached cylinders (as depicted) or another shape that lacks distinct edges (e.g., a sphere). Additionally or alternatively, the particular object 102 may have a shape that includes a large planar surface, such as the object 108 of the plurality of objects 104.

The system 100 of the illustrated embodiment may include a computing device 110 as depicted in FIG. 1B, a robot 112, an imaging device 114, and a network 120. The imaging device 114 may, for example, correspond to a camera or a scanner. The imaging device 114 of embodiments may be configured to generate an image 116 of the plurality of objects 104. The image 116 may correspond to a three dimensional image of an object, such as the particular object 102 or the plurality of objects 104. As an example, the image 116 may be a grayscale image with a depth image or the image 116 may be a red green blue (RGB) image with a depth image. The imaging device 114 may be a time-of-flight camera capable of generating an image 116 that may be a three dimensional image. Alternatively, the imaging device 114 may comprise at least two stereoscopically positioned cameras such that a first image generated by a first stereoscopically positioned camera and a second image generated by the second stereoscopically positioned camera are combinable to generate a three dimensional image. The image 116 may incorporate information about the position of the plurality of objects 104 and the orientation of the plurality of objects 104. In particular, the image 116 may include six dimensional pose data corresponding to a six dimensional pose of the plurality of objects 104 relative to a known coordinate system of the imaging device 114. A six dimensional pose of an object may include information about the object's position in a three dimensional coordinate system (e.g., corresponding to x, y, and z axes of a Cartesian coordinate system of a field of view of an imaging device such as the imaging device 114) and the object's orientation in the three dimensional coordinate system (e.g., corresponding to Euler angles $\alpha$, $\beta$, and $\gamma$ of the Cartesian coordinate system of the field of view of an imaging device such as the imaging device 114). The imaging device 114 may include functionality (not depicted), such as a transmitter, to transmit the image 116 to the computing device 110 via a network 120.

The computing device 110, depicted in FIG. 1B, may include a processor 122, a memory 124, an input/output device 126, and a network interface 128, all as shown in FIG. 1B. The memory 124, as shown in FIG. 1B, may be a random access memory (RAM), a dynamic random access memory (DRAM), or other electronic memory. The memory 124 may include ROM devices, RAM devices, one or more HDDs, flash memory devices, SSDs, other devices configured to store data in a persistent or non-persistent state, or a combination of different memory devices. The memory 124 may include one or more memory components. The memory 124 may be configured to store a database of three dimensional representations of objects, such as computer aided design (CAD) representations of objects, resembling the geometry of the particular object 102, depicted in FIG. 1A, or the plurality of objects 104, shown in FIG. 1A. As an example, a particular three dimensional representation of an object 130, depicted in FIG. 1B, geometrically resembles the particular object 102, shown in FIG. 1A. In another example, the memory 124 may be configured to store a three dimensional representation of an object, such as the three dimensional representation of the object 130, in Initial Graphics Exchange Specification (IGES) format, Drawing eXchange Format (DXF), or other suitable format for the storage of graphical data. The memory 124 may further be configured to store instructions that, when executed by the processor 122 cause the processor 122 to perform the exemplary methods described elsewhere in this disclosure. Moreover, the memory 124 may be configured to store target three dimensional point cloud data 132, as shown in FIG. 1B, extracted from the image 116 and other data.

The processor 122, depicted in FIG. 1B, may be a graphical processing unit (GPU) or other processor capable of processing image data known in the art. For instance, the processor 122 may comprise various forms of processor-based systems in accordance with aspects described herein. The processor 122 may include a general purpose computer system (e.g., a personal computer (PC), a server, a tablet device, etc.) and/or a special purpose processor platform (e.g., application specific integrated circuit (ASIC), system on a chip (SoC), etc.). In some implementations, the processor 122 may include one or more processors. The processor 122 may be configured to convert the image 116 of FIG. 1A into three dimensional point cloud data. The three dimensional point cloud data may encode a position (relative to the imaging device 114) and an orientation (relative to the imaging device 114) of each pixel of the image 116 into a data format storable in the memory 124. Three dimensional point cloud data corresponding to the image 116 may be referred to as target three dimensional point cloud data 132 as shown in FIG. 1B. The processor 122 may further be configured to store the target three dimensional point cloud data 132 in memory 124. Additionally, the processor 122 may be configured to convert the three dimensional representation of the object 130 into three dimensional point cloud data, referred to as model three dimensional point cloud data 134, as depicted in FIG. 1B. Moreover, the processor 122 may be configured to store the model three dimensional point cloud data 134 in the memory 124.

Further, the processor 122 may be configured to generate six dimensional pose hypotheses data 136, as shown in FIG. 1B, corresponding to a plurality of six dimensional pose hypotheses. Each six dimensional pose hypothesis of the plurality of six dimensional pose hypotheses may correspond to a particular translation matrix and to a particular rotation matrix. When coordinates of a model three dimensional point of the model three dimensional point cloud data 134 are operated on by (e.g., multiplied by) the translation matrix, the coordinates of the model three dimensional point may be transformed in the spatial directions of the coordinate system of the imaging system 114. When coordinates of the model three dimensional points of the model three dimensional data 134 are operated on by (e.g., multiplied by) the rotation matrix, the coordinates of the model three dimensional point may be transformed along the Euler angles of the coordinate system of the imaging system 114. The processor 122 may be configured to generate the six dimensional pose hypotheses data 136 through application of local three dimensional point pair feature matching techniques as are known in the art, an exemplar of which is explained in FIGS. 6A and 6B. Alternatively, other techniques, known in the art, may be used to generate the six dimensional pose hypotheses data 136. For example, random sample consensus techniques may be used to generate the six dimensional pose hypotheses data 136. The processor 122 may further be configured to store the six dimensional pose hypotheses data 136 in the memory 124.

Additionally, the processor 122 may be configured to select a candidate six dimensional pose hypothesis from the six dimensional pose hypotheses data 136. In an embodiment, the processor 122 may be configured to select first data corresponding to a first set of six dimensional pose hypotheses from six dimensional pose hypotheses data 136. The first data corresponding to the first set of six dimensional pose hypotheses may be randomly selected from the six dimensional pose hypotheses data 136. Alternatively, the processor 122 may be configured to assign a value to each six dimensional pose hypothesis of the plurality of six dimensional pose hypotheses. The value may be indicative of a probability that a six dimensional pose hypothesis corresponds to the candidate six dimensional pose hypothesis.

In an embodiment, the processor 122 may be configured to perform parallel mathematical operations on an instantiation of model three dimensional point cloud data 134 using the first data corresponding to the first set of six dimensional pose hypotheses to generate instances of transformed model three dimensional point cloud data. Each instance of transformed model three dimensional point cloud data may correspond to model three dimensional points of the model three dimensional point cloud data 134 that have been translated and rotated in a particular and unique way by a six dimensional pose hypothesis selected from the first set of six dimensional pose hypotheses. For example, the processor 122 may, in parallel, multiply coordinates of an instantiation of the model three dimensional point cloud data 134 by translation and rotation matrices corresponding to each six dimensional pose hypothesis of a first set of six dimensional pose hypotheses to generate each unique instance of transformed model three dimensional point cloud data.

In another embodiment, the processor 122 may be configured to generate a threshold number of copies of model three dimensional point cloud data 134. The threshold number of copies of the model three dimensional point cloud data 134 may correspond to a size of the memory 124. The processor 122 may be configured to store data corresponding to each coordinate of each point of the model three dimensional point cloud data 134 at an address of the memory 124. The processor 122 may be configured to perform parallel mathematical operations on each copy of the model three dimensional point cloud data, using each six dimensional pose hypothesis of the first plurality of six dimensional pose hypotheses, to generate multiple instances of transformed model three dimensional point cloud data. To illustrate, the processor 122 may be configured to, in parallel, multiply each coordinate of each model three dimensional point of each copy of the model three dimensional point cloud data by the translation and rotation matrices corresponding to each six dimensional pose hypothesis of the first plurality of six dimensional pose hypotheses. Outputs of the foregoing operation may comprise multiple instances of transformed model three dimensional point cloud data.

In embodiments, the plurality of six dimensional pose hypotheses may exceed the first set of six dimensional pose hypotheses. Thus, the processor 122 may be configured to iteratively process a second set of six dimensional pose hypotheses selected from the six dimensional pose hypotheses data 136 in the same manner as described above. For example, the processor 122 may be configured to perform parallel mathematical operations on an instantiation of model three dimensional point cloud data 134 using second data corresponding to a second plurality of six dimensional pose hypotheses, selected from the pose hypotheses data 136, to generate instances of transformed model three dimensional point cloud data.

The processor 122 may further be configured to determine an overlap between transformed model three dimensional points corresponding to instances of the transformed model three dimensional point cloud data and target three dimensional point cloud data 132. Additionally, the processor 122 may be configured to identify six dimensional pose hypotheses (such as a first six dimensional pose hypothesis from the first set of six dimensional pose hypotheses or a second six dimensional pose hypothesis from a second set of six dimensional pose hypotheses) that generate the largest number of transformed model three dimensional points that overlap with target model three dimensional points. The six dimensional pose hypothesis generating the largest number of transformed three dimensional points that overlap with the target three dimensional points may correspond to a candidate pose six dimensional pose hypothesis.

In an embodiment, the processor 122 may be configured to calculate a distance (e.g., a Euclidean distance) between each transformed model three dimensional point of an instance of transformed model three dimensional point cloud data and each target three dimensional point of the target three dimensional point cloud data 132. The processor 122 may be configured to compare a value corresponding to each distance against a threshold value. If the value is less than the threshold value, the processor 122 may be configured to increment an overlap coefficient corresponding to a six dimensional pose hypothesis that generated the transformed model three dimensional point. The overlap coefficient may correspond to a quantity of transformed model three dimensional points associated with an instance of transformed model three dimensional point cloud data for which the distance calculated between the transformed model three dimensional points and the target three dimensional points is less than the threshold. Thus, the overlap coefficient may be a measure of an extent to which a six dimensional pose hypothesis generates a match between a particular instance of transformed model three dimensional point cloud data and the target three dimensional point cloud data 132. To elaborate, a larger overlap coefficient indicates a better match between an instance of transformed model three dimensional point cloud data generated by a particular six dimensional pose hypothesis and the target three dimensional point cloud data 132 than a smaller overlap coefficient.

In an embodiment, after generating transformed model three dimensional point cloud data through application of each six dimensional pose hypothesis to the model three dimensional point cloud data 134, the processor 122 may be configured to compare all of the overlap coefficients associated with each six dimensional pose hypothesis of the first set of six dimensional pose hypotheses and the second set of six dimensional pose hypotheses to identify the six dimensional pose hypothesis corresponding to the largest overlap coefficient. The processor 122 may be configured to select the six dimensional pose hypothesis corresponding to the largest overlap coefficient, and the selected six dimensional pose hypothesis may comprise the candidate six dimensional pose hypothesis data.

The processor 122 additionally may be configured to generate control data 138 based, at least in part, on the candidate six dimensional pose hypothesis data. The control data 138 may include instructions based, at least in part, on the candidate six dimensional pose hypothesis. The instructions may be configured to cause a mechanical arm 146, as depicted in FIG. 1A, of the robot 112 of FIG. 1A to move to a particular position and in a particular orientation to grasp the particular object 102 of FIG. 1A. The processor 122 may be configured to transmit the control data 138 of FIG. 1B, including candidate six dimensional pose hypothesis data, to the robot 112 via the network interface 128 shown in FIG. 1B and thereby through the network 120 of FIG. 1A.

The input/output device 126 of FIG. 1B may include a mouse, a keyboard, a display device, the camera, other input/output devices, or a combination thereof. In an implementation, the input/output device 126 may be configured to display a graphical user interface (GUI) generated by the processor 122. The input/output device 126 may be configured to receive user input, possibly through the GUI, such as an instruction to identify the particular object 102 of FIG. 1A. Alternatively or additionally, the input/output device 126 may be configured to receive an instruction, possibly through the GUI, to identify the three dimensional representation of the object 130 from among the plurality of objects 104 of FIG. 1A.

The network interface 128 may be configured to communicatively couple the computing device 110 to the robot 112 of FIG. 1A and to the imaging device 114 of FIG. 1A. For example, the processor 122 may be configured to cause the network interface 128 to transmit the control data 138, including the candidate six dimensional pose hypothesis data, to the robot 112 of FIG. 1A via the network 120 of FIG. 1A. Further, the network interface 128 may be configured to receive the image 116 of FIG. 1A from the imaging device 114 of FIG. 1A via the network 120 of FIG. 1A. In an implementation, a user may provide an instruction, through user device 148 of FIG. 1A, to identify and select the particular object 102, shown in FIG. 1A, or to identify and select from among the plurality of objects 104 of FIG. 1A an object that geometrically resembles the three dimensional representation of the object 130 of FIG. 1B. The instruction sent via the user device 148 of FIG. 1A may be received at the network interface 128 of FIG. 1B via the network 120 of FIG. 1A.

As depicted in FIG. 1A, the robot 112 may include a processor 140, a memory 142, a network interface 144, and a mechanical arm 146. The network interface 144 is configured to receive data, such as the control data 138 that includes the candidate six dimensional pose hypothesis data. The robot 112 further comprises a processor 140 configured to execute instructions, including instructions encoded in the control data 138. The processor 140 is further configured to provide control instructions to the mechanical arm 146 to cause the mechanical arm 146 to move in a particular position and in a particular orientation based on the control data 138 including the candidate six dimensional pose hypothesis data. For instance, the control data 138 may cause the mechanical arm 146 to move in a position and in an orientation to grapple the particular object 102 based, at least in part, on the candidate six dimensional pose hypothesis data included in the control data 138. In a particular embodiment, the computing device 110 of FIG. 1B may be integrated into the robot 112.

FIGS. 2A-1, 2B-1, 2A-2, and 2B-2 provide an overview of an exemplary method 200 for selecting a candidate six dimensional pose hypothesis from among a plurality of six dimensional pose hypotheses in accordance with concepts of the present invention. As explained below, the method 200 may use an image of a plurality of objects that includes an object to be identified and a three dimensional representation of the object to be identified to quickly select a candidate six dimensional pose hypothesis from among a plurality of six dimensional pose hypotheses. The candidate six dimensional pose hypothesis may correspond to a position and to an orientation of the three dimensional representation of the object that may substantially match a position and an orientation of the object in the image. In this manner, an object can be identified in an image of the plurality of objects that includes the object.

Figures 1, 2A, 2B:
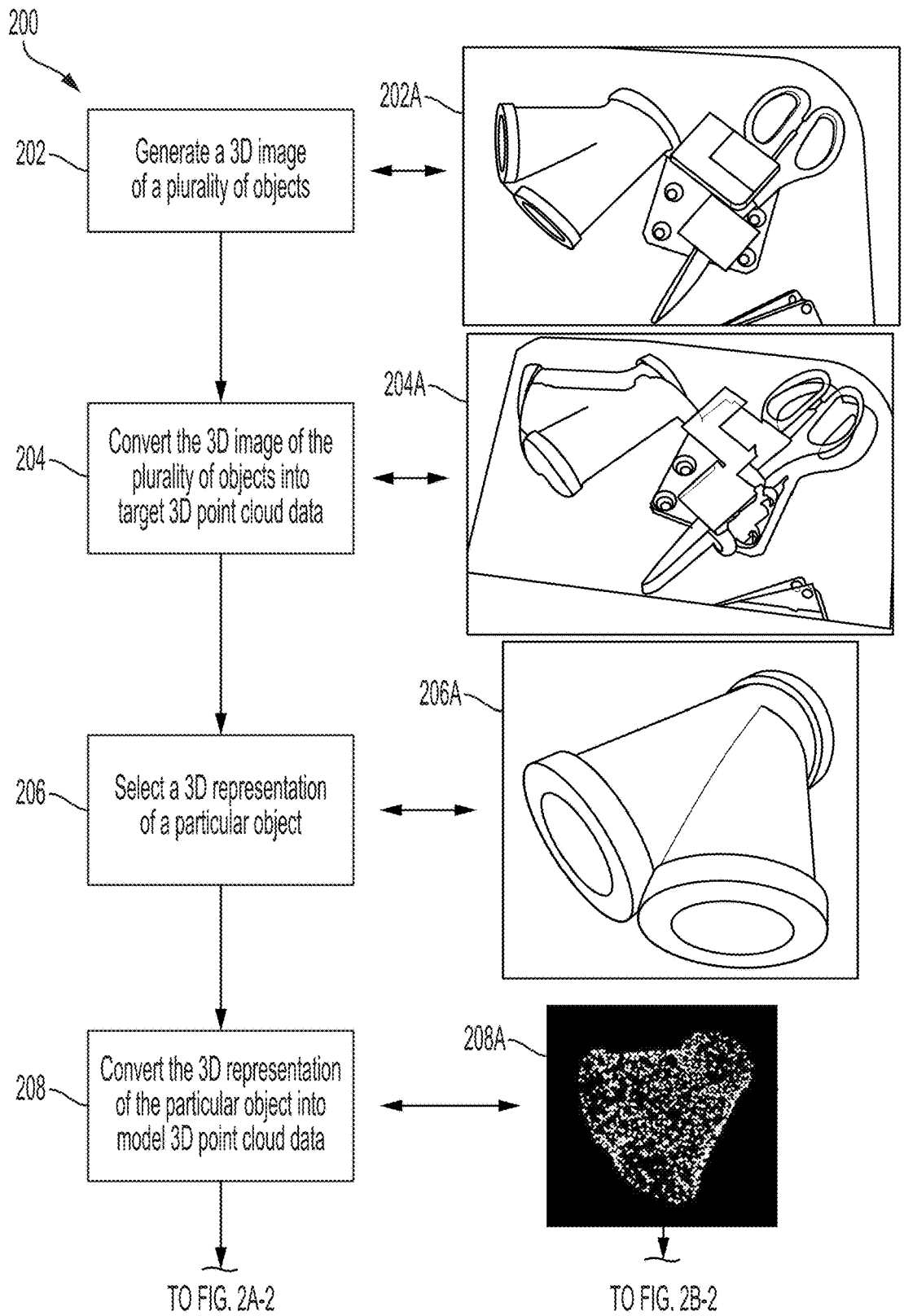

At block 202 of FIG. 2A-1, a three dimensional image 202A of a plurality of objects, as depicted in FIG. 2B-1, may be generated. The three dimensional image 202A may be generated through use of a time-of-flight imaging system. Alternatively, the three dimensional image 202A might be generated by stereoscopically positioned cameras. Other methods known in the art can be used to generate the three dimensional image 202A.

At block 204 of FIG. 2A-1, the three dimensional image 202A of the plurality of objects may be converted into target three dimensional point cloud data 204A, as depicted in FIG. 2B-1. In an example, data corresponding to each spatial coordinate (i.e., the x coordinate, y coordinate, and z coordinate of a Cartesian coordinate system of the imaging device used to generate the three dimensional image 202A) may be extracted from the three dimensional image 202A. Further, the extracted data may include information about an orientation of each point relative to the imaging device used to generate the three dimensional image 202A. For instance, a normal vector pointing in the direction of the imaging device may be assigned to points that are relatively proximate to the imaging device that generates the three dimensional image 202A, while a normal vector pointing away from the imaging device may be assigned to points that are relatively distant from the imaging device that generated the three dimensional image 202A. The extracted data may comprise the target three dimensional point cloud data 204A as depicted in FIG. 2B-1. The target three dimensional point cloud data 204A may be stored in a computer memory, such as the memory 124 of FIG. 1B.

At block 206 of FIG. 2A-1, a three dimensional representation of a particular object 206A, as depicted in FIG. 2B-1, may be selected. The three dimensional representation of the particular object 206A may be a computer-aided design (CAD) rendering of the particular object 206A. Other methods of rendering three dimensional objects known in the art may be used to generate the three dimensional representation of the particular object 206A. In an embodiment, a computer memory, such as the memory 124 of FIG. 1B, may store three dimensional representations of a plurality of objects likely to be encountered in the context of the device that executes the method 200. For instance, if the device that executes the method 200 is located in a factory that produces windows, the device may include in its memory a three dimensional representation of a large planar surface, representing a window.

At block 208 of FIG. 2A-1, the three dimensional representation of the particular object 206A may be converted into model three dimensional point cloud data 208A, as depicted in FIG. 2B-1. As with the target three dimensional point cloud data 204A, the model three dimensional point cloud data 208A may store information about a position of each pixel (relative to an imaging device) corresponding to the three dimensional representation of the particular object 206A, and information about the orientation of each pixel (relative to the imaging device) corresponding to the three dimensional representation of the particular object. In an implementation, the model three dimensional point cloud data 208A may be stored in a computer memory, such as the memory 124 of FIG. 1B.

At optional block 210 of FIG. 2A-2, the target model three dimensional point cloud data 204A may be filtered to remove data corresponding to objects that are geometrically different from the three dimensional representation of the particular object 206A to generate filtered three dimensional point cloud data 210A as depicted in FIG. 2B-2. For example, the three dimensional image 202A of FIG. 2B-1 includes images of a plurality of objects. However, it may be desired to identify an image of a particular object within the three dimensional image 202A of the plurality of objects. The image of the particular object may have a geometry substantially similar to the three dimensional representation of the particular object 206A of FIG. 2B-1. An output of the optional filtration block 210 of FIG. 2A-2 may be an image of the particular object having a geometry similar to the three dimensional representation of the particular object 206A. The output of optional block 210 may be referred to as filtered three dimensional point cloud data 210A as depicted in FIG. 2B-2.

To achieve the optional filtration block 210 of FIG. 2A-2, deep learning algorithms, known in the art, may be used. For example, the target three dimensional point cloud data 204A of FIG. 2B-1 might be provided as an input to a mask convolutional neural network trained to identify, from within the target three dimensional point cloud data 204A of FIG. 2B-1, an image of an object geometrically resembling the three dimensional representation of the particular object 206A of FIG. 2B-1. As an output, the mask convolutional neural network may generate filtered three dimensional point cloud data 210A of FIG. 2B-2 that geometrically resembles the three dimensional representation of the particular object 206A of FIG. 2B-1. In some examples, the filtered three dimensional point cloud data 210A of FIG. 2B-2 may be referred to as a segmentation image.

At optional block 212 of FIG. 2A-2, three dimensional point cloud data 208A of FIG. 2B-1 or filtered three dimensional point cloud data 210A of FIG. 2B-2 may be partitioned. A partition number may be assigned to each partition. Thus, optional block 212 of FIG. 2A-2 may generate partitioned target three dimensional point cloud data 212A, as depicted in FIG. 2B-2. The partitioned target three dimensional point cloud data 212A of FIG. 2B-2 may be used in a determination of an extent to which transformed model three dimensional points of an instance of transformed model three dimensional point cloud data overlap with target three dimensional points as explained in the context of FIG. 3.

At block 214 of FIG. 2A-2, a plurality of six dimensional pose hypotheses 214A, as shown in FIG. 2B-2, may be generated. In an example, the plurality of six dimensional pose hypotheses 214A may be generated through use of a local three dimensional feature match method, such as the method described in FIGS. 6A and 6B. In other embodiments, other methods, known in the art, may be used to generate the plurality of six dimensional pose hypotheses 214A. For instance, random sampling consensus methods may be used to generate the plurality of six dimensional pose hypotheses 214A. Regardless of the methods used to generate the plurality of six dimensional pose hypotheses 214A, in implementations, at least hundreds of thousands and perhaps millions of six dimensional pose hypotheses may be generated.

At block 216 of FIG. 2A-2, a candidate six dimensional pose hypothesis 216A, depicted in FIG. 2B-2, may be selected from among the plurality of six dimensional pose hypotheses 214A of FIG. 2B-2. The candidate six dimensional pose hypothesis 216A corresponds to a translation matrix that is configured to translate the model three dimensional point cloud data 208A of FIG. 2B-1 and to a rotation matrix that is configured to rotate the model three dimensional point cloud data 208A such that the translated and rotated model three dimensional point cloud data 208A substantially overlaps with the target three dimensional point cloud data 204A of FIG. 2B-1, the filtered target three dimensional point cloud data 210A of FIG. 2B-2, or the partitioned target three dimensional point cloud data 212A of FIG. 2B-2. In embodiments, the phrase "substantially overlaps with" means that a Euclidean distance calculated between a majority of the translated and rotated model three dimensional point cloud data 208A of FIG. 2B-1 and the target three dimensional point cloud data 204A of FIG. 2B-1, the filtered target three dimensional point cloud data 210A of FIG. 2B-2, or the partitioned target three dimensional point cloud data 212A of FIG. 2B-2 is less than a threshold distance value. The threshold distance value might be set by a user of the device that executes the method 200. In other embodiments, the phrase "substantially overlaps with" means that the majority of the translated and rotated model three dimensional point cloud data 208A of FIG. 2B-1 and the target three dimensional point cloud data 204A of FIG. 2B-1, the filtered target three dimensional point cloud data 210A of FIG. 2B-2, or the partitioned target three dimensional point cloud data 212A of FIG. 2B-2 have substantially similar positions and orientations.

Figure 3:
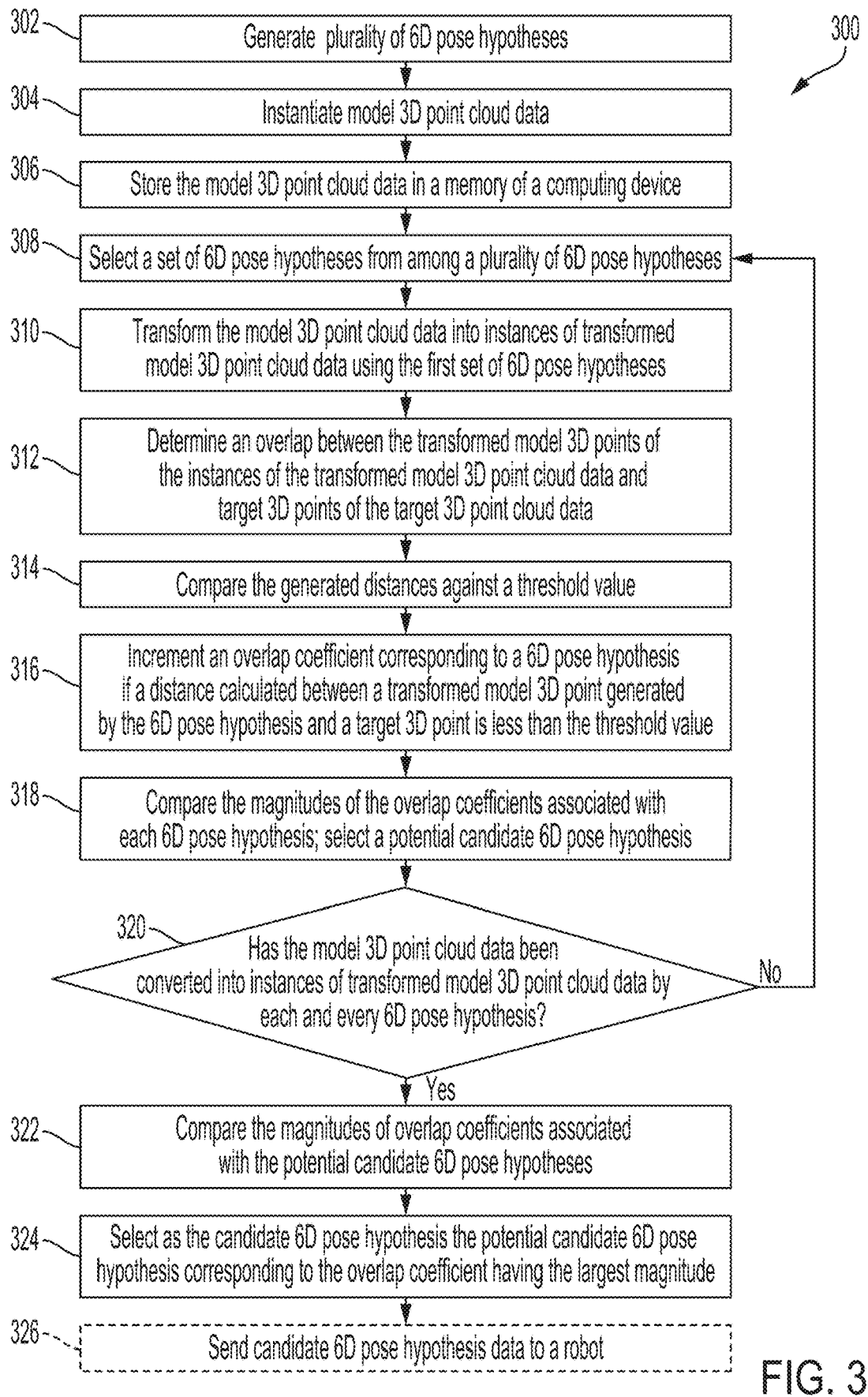
FIG. 3 is a flowchart detailing an exemplary method for selecting a candidate six dimensional pose hypothesis from among a plurality of six dimensional pose hypotheses according to embodiments of the present invention.

FIG. 3 describes particular details of an exemplary method 300 for selecting a candidate six dimensional pose hypothesis from among a plurality of six dimensional pose hypotheses in accordance with concepts of the present invention. As explained below, the method 300 may enhance computational efficiency through parallelization of mathematical operations performed on model three dimensional point cloud data to generate multiple instances of transformed model three dimensional point cloud data. Further operations may be performed on each instance of transformed model three dimensional point cloud data to generate measures of overlap between the instances of transformed model three dimensional point cloud data and target three dimensional point cloud data corresponding to an image of an object to be identified. These measures of overlap may be indicative of how well a six dimensional pose hypothesis aligns a three dimensional representation of the object to be identified with the image of the object to be identified. Thus, a six dimensional pose hypothesis having the largest measure of overlap may be selected as the candidate six dimensional pose hypothesis from among a plurality of six dimensional pose hypotheses.

At block 302, a plurality of six dimensional pose hypotheses may be generated. A quantity of the plurality of six dimensional pose hypotheses may correspond to every possible translation and every possible rotation of a three dimensional representation of an object, such as the three dimensional representation of the object 130 of FIG. 1B. As another example, the quantity of the plurality of six dimensional pose hypotheses may be set by a user, such as by a user of the system 100. The plurality of six dimensional pose hypotheses may be generated by techniques known in the art, such as by local three dimensional point pair feature algorithms, an exemplar of which is explained with reference to FIGS. 6A and 6B.

At block 304, model three dimensional point cloud data is instantiated. In an embodiment, a threshold number of copies of model three dimensional point cloud data may be generated. The threshold number may correspond to a size of a computer memory, such as a size of a memory of a computing device on which the method 300 is performed. As an additional example, the threshold number may equal a size of the memory 124 shown in FIG. 1B of the computing device 110 of FIG. 1B. In other implementations, the threshold number might be smaller than a size of the memory of the computing device on which the method 300 is performed or of the computing device 110 of FIG. 1B. In an alternative embodiment, a single instantiation of model three dimensional point cloud data is generated.

At block 306, the model three dimensional point cloud data may be stored in a memory, such as a memory of a computing device. For example, the threshold number of copies of model three dimensional point cloud data may be stored in a memory. The model three dimensional point cloud data may be stored in a data structure corresponding to a one dimensional array. For example, in an embodiment, data corresponding to each coordinate of each model three dimensional point of each copy of the model three dimensional point cloud data may be stored in an address of the memory. Although a one dimensional array is an exemplary data structure used to store the model three dimensional point cloud data, other data structures may be used. For instance, a C++ vector data structure may be used. In an alternative embodiment, a single instantiation of model three dimensional point cloud data may be generated. For example, in an object oriented computer language, such as C++ or Java, a model three dimensional point cloud data class may be instantiated, and the class may include a first variable configured to store a value corresponding to an x coordinate of a model three dimensional point, a second variable configured to store a value corresponding to a y coordinate of a model three dimensional point, and a third variable configured to store a value corresponding to a z coordinate of a model three dimensional point.

At block 308, a set of six dimensional pose hypotheses, corresponding to a number of six dimensional pose hypotheses, may be selected from among the plurality of six dimensional pose hypotheses. In an embodiment, the number of six dimensional pose hypotheses comprising the set of six dimensional pose hypotheses may correspond to the threshold number of copies of model three dimensional point cloud data stored in a memory, such as the memory 124 of FIG. 1B. This first set of six dimensional pose hypotheses may be randomly selected from among the plurality of six dimensional pose hypotheses. Alternatively, when the plurality of six dimensional pose hypotheses are generated, a value might be assigned to each six dimensional pose hypothesis of the plurality of six dimensional pose hypotheses. The assigned value may correspond to an initial indicator of the probability that the six dimensional pose hypothesis is likely be a good match for the target three dimensional point cloud data. For example, in generating the plurality of six dimensional pose hypotheses, a number of transformed model three dimensional points generated by a particular six dimensional pose hypothesis and corresponding to an instantiation of transformed model three dimensional point cloud data may be randomly selected. A distance (e.g., a Euclidean distance) may be calculated between each of the number of randomly selected transformed model three dimensional points and each of the target three dimensional points of the target three dimensional point cloud data. If a designated number of the distances are less than a threshold value, then a value might be assigned to the particular six dimensional pose hypothesis. The value might be indicative of a high match probability between the transformed model three dimensional points generated by the particular six dimensional pose hypothesis and the target three dimensional point data. In an embodiment, the number of six dimensional pose hypotheses, corresponding to the first set of six dimensional pose hypotheses, selected from among the plurality of six dimensional pose hypotheses, may equal the threshold number of copies of the three dimensional model point cloud data.

At block 310, the model three dimensional point cloud data may be transformed into instances of transformed model three dimensional point cloud data using the first set of the six dimensional pose hypotheses. For example, the model three dimensional point cloud data may be transformed into instances of transformed model three dimensional point cloud data through parallel mathematical operations in which each six dimensional pose hypothesis of the selected pose hypotheses (i.e., the pose hypotheses selected at block 308 and comprising a first set of pose hypotheses) are applied to the model three dimensional point cloud data. To illustrate, coordinates of model three dimensional points corresponding to model three dimensional point cloud data (e.g., an instantiation of the model three dimensional point cloud data or, in an alternative embodiment, each copy of the model three dimensional point cloud data) may be operated on by (e.g., multiplied by) translation and rotation matrices corresponding to each six dimensional pose hypothesis. In this manner, multiple instances of transformed model three dimensional point cloud data may be generated in parallel, each instance of the transformed model three dimensional point cloud data having transformed model three dimensional points that are translated and oriented in a particular way corresponding to the particular translation and rotation matrices associated with the corresponding six dimensional pose hypothesis.

In a particular embodiment and as an illustrative example, three copies of model three dimensional point cloud data may be instantiated. In this example, each model three dimensional point of a first copy of the model three dimensional point cloud data may be multiplied by a translational matrix and a rotation matrix associated with a first six dimensional pose hypothesis of the selected six dimensional pose hypotheses (i.e., the first set of six dimensional pose hypotheses) to generate translated and rotated three dimensional points comprising a first instance of transformed model three dimensional point cloud data. In parallel, each model three dimensional point of a second copy of the model three dimensional point cloud data is multiplied by a translational matrix and a rotation matrix associated with a second six dimensional pose hypothesis of the selected six dimensional pose hypotheses (i.e., the first set of pose hypotheses) to generate translated and rotated three dimensional points comprising a second instance of transformed model three dimensional point cloud data. Further, and in parallel, each model three dimensional point of a third copy of the model three dimensional point cloud data is multiplied by a translational matrix and a rotation matrix associated with a third pose hypothesis of the selected pose hypotheses (i.e., the first set of pose hypotheses) to generate translated and rotated three dimensional points comprising a third instance of transformed model three dimensional point cloud data. The foregoing example is for illustrative purposes only. In many embodiments, hundreds, thousands, hundreds of thousands, or millions of copies of model three dimensional point cloud data may be generated, and the above operations may be performed, in parallel, on each copy. As another example and to further elaborate, the transformation of each model three dimensional point of the model three dimensional point cloud data into a transformed model three dimensional point and the transformation of each copy of model three dimensional point cloud data into an instance of transformed model three dimensional point cloud data may be performed in parallel.

Alternatively, in another example corresponding to a different embodiment, multiple instances of transformed model three dimensional point cloud data are generated by iteratively applying each six dimensional pose hypothesis of the plurality of six dimensional pose hypotheses to a single instance of model three dimensional point cloud data. To illustrate, coordinates corresponding to an instantiation of model three dimensional point cloud data may be iteratively multiplied by translation and rotation matrices corresponding to each six dimensional pose hypothesis of a plurality of six dimensional pose hypotheses.

At block 312, an overlap may be determined between transformed model three dimensional points of instances of the transformed model three dimensional point cloud data and target three dimensional points of the target three dimensional point cloud data. In an embodiment, the overlap may correspond to a Euclidean distance between transformed model three dimensional points of an instance of transformed model three dimensional point cloud data and corresponding points of the target three dimensional point cloud data. The distance calculation may be performed in real time between each transformed model three dimensional point of the instance of transformed model three dimensional point cloud data and target three dimensional points of the target three dimensional point cloud data.

In an embodiment in which the target three dimensional point cloud data has been partitioned as described in the context of FIGS. 2A-2 and 2B-2, specifically block 212 of FIG. 2A-2, a Euclidean distance may be determined between each target three dimensional point corresponding to and located at a particular partition number and transformed model three dimensional points of each instance of the transformed model three dimensional point cloud data. To elaborate, the partition number is determined based on the location of a transformed model three dimensional point, and a distance calculation can be performed between the transformed model three dimensional point and the target three dimensional points in the partition corresponding to the determined partition number. Referring to FIGS. 2A-2 and 2B-2, and as an example, a distance may be determined between target three dimensional points corresponding to partition two of the partitioned target three dimensional point cloud data 212A, depicted in FIG. 2B-2, and transformed model three dimensional points of each instance of the transformed model three dimensional point cloud data. In other examples, a Euclidean distance may be determined between target three dimensional points corresponding to other partition numbers of the partitioned target three dimensional point cloud data 212A, as shown in FIG. 2B-2, and transformed model three dimensional points corresponding to each instance of transformed model three dimensional point cloud data. Determining a Euclidean distance between target three dimensional points corresponding to a particular partition number of the partitioned target three dimensional point cloud data 212A and transformed model three dimensional points of an instance of transformed model three dimensional point cloud data \reduces a number of distance calculations performed and enhances computational efficiency. In this manner, a speed with which the exemplary method 300 can be performed may be increased, and a time needed to identify an object from among a plurality of objects may be reduced.

At block 314, distances generated at block 312 may be compared against a threshold value. The threshold value may be set by a user, such as a user of the system 100 of FIGS. 1A and 1B. The comparison of block 314 may be performed for each distance calculated between each copy of each transformed model three dimensional point of the transformed model three dimensional point cloud data and each target three dimensional point of the target three dimensional point cloud data. Alternatively, the comparison of block 314 may be performed for each distance calculated between each transformed model three dimensional point and each target three dimensional point associated with a partition number.

At block 316, an overlap coefficient corresponding to a six dimensional pose hypothesis of the first plurality of pose hypotheses may be incremented if the distance calculated between a transformed model three dimensional point generated by the six dimensional pose hypothesis and a target three dimensional point is less than the threshold value. The overlap coefficient may correspond to a measure of a number of transformed model three dimensional points, generated by a particular six dimensional pose hypothesis, that overlap with the target three dimensional points. For example, if a first overlap coefficient associated with a first six dimensional pose hypothesis is greater than a second overlap coefficient associated with a second six dimensional pose hypothesis, then a larger number of transformed model three dimensional points generated by the first six dimensional pose hypothesis than generated by the second six dimensional pose hypothesis have distances (e.g., Euclidean distances) between target three dimensional points that are less than the threshold value. Thus, in this example, the first six dimensional pose hypothesis generates a greater number of transformed model three dimensional points that overlap with target three dimensional points than the second six dimensional pose hypothesis. Consequently, in this example, the translation matrix and the rotation matrix corresponding to the first six dimensional pose hypothesis generates an instance of transformed model three dimensional point cloud data that more closely overlaps with the target three dimensional point cloud data than the translation matrix and the rotation matrix corresponding to the second six dimensional pose hypothesis.

In an embodiment, each overlap coefficient corresponding to each six dimensional pose hypothesis of the plurality of six dimensional pose hypotheses may be stored in an address of a memory of a computing device that executes the method 300. For instance, after all of the distance calculations described herein are performed, each overlap coefficient might be overwritten onto an address of a memory in which data corresponding to a coordinate of a transformed model three dimensional point was previously stored.

At block 318, the magnitudes of the overlap coefficients may be compared. For example, a magnitude of each overlap coefficient may be compared against a magnitude of every other overlap coefficient. A six dimensional pose hypothesis of the first set of six dimensional pose hypotheses corresponding to the overlap coefficient having the largest magnitude may be selected as a potential candidate six dimensional pose hypothesis. The potential six dimensional candidate pose hypothesis may be the six dimensional pose hypothesis among the first set of six dimensional pose hypotheses that generated the largest number of transformed model three dimensional points overlapping with target three dimensional points.

At block 320, it may be determined whether model three dimensional point cloud data has been transformed into an instance of transformed model three dimensional point cloud data by each and every six dimensional pose hypothesis of the plurality of six dimensional pose hypotheses. If it is determined that six dimensional pose hypotheses of the plurality of six dimensional pose hypotheses have not been used to transform the model three dimensional point cloud data, the method 300 may return to block 308. At block 308, pose hypotheses of the plurality of pose hypotheses that had not previously been selected may be selected, and the second set of selected pose hypotheses may be applied in blocks 310-316. At block 318, the magnitudes of the overlap coefficients corresponding to each six dimensional pose hypothesis of the second set of selected six dimensional pose hypotheses may be compared. The six dimensional pose hypothesis corresponding to the overlap coefficient having the largest magnitude may be selected as the potential candidate six dimensional pose hypothesis from among the second set of selected six dimensional pose hypotheses.

At block 320, if it is determined that model three dimensional point cloud data has been converted into instances of transformed model three dimensional point cloud data by each and every six dimensional pose hypothesis of the plurality of six dimensional pose hypotheses generated at block 302, the method 300 may proceed to block 322. At block 322, a magnitude of each overlap coefficient associated with each potential candidate six dimensional pose hypothesis may be compared against a magnitude of other overlap coefficients associated with every other potential candidate six dimensional pose hypothesis. At block 324, the candidate six dimensional pose hypothesis may be selected from among the potential candidate six dimensional candidate pose hypotheses. The potential candidate six dimensional pose hypothesis corresponding to an overlap coefficient having the largest magnitude may be selected as the candidate six dimensional pose hypothesis. In an example in which there exists only one potential candidate six dimensional pose hypothesis, the potential candidate six dimensional pose hypothesis may be selected as the candidate six dimensional pose hypothesis.

At optional block 326, candidate six dimensional pose hypothesis data corresponding to the candidate six dimensional pose hypothesis may be sent to a robot, such as the robot 112 of FIG. 1A. The candidate six dimensional pose hypothesis data may be used, in conjunction with control instructions (e.g., the control data 138 of FIG. 1B), to cause a robot to grasp an object (i.e., the object identified by the candidate six dimensional pose hypothesis) from among a plurality of objects. In this manner, the candidate six dimensional pose hypothesis data corresponding to the candidate six dimensional pose hypothesis may be used to effectuate an action, such as the identification and manipulation of an object from among a plurality of objects by a robot, such as the robot 112 of FIG. 1A.

Generating multiple instances of transformed model three dimensional point cloud data through parallel mathematical operations performed on each model three dimensional point of the model three dimensional point cloud data and each copy of the model three dimensional point cloud data using selected six dimensional pose hypotheses from a plurality of six dimensional pose hypotheses may reduce computer processing time, since the mathematical operations are performed in parallel rather than in series. For instance, a conventional process may generate instances of transformed model three dimensional point cloud data serially using six dimensional pose hypotheses. Such a conventional process may be relatively slow.

As an example, the method 300 was executed on a computing device to identify a particular object from among a plurality of objects. The method 300 led to successful identification of the object from among a plurality of objects within approximately 0.3 seconds. The well-known and conventional Drost point pair feature algorithm also was executed on the same computing device to identify the same particular object from among a plurality of objects. The Drost point pair feature algorithm took approximately 0.5 seconds to identify the same object from among the plurality of objects. Thus, the method 300 may lead to an improved object identification time compared to a conventional method.

Further, iteratively generating additional instances of transformed model three dimensional point cloud data in response to determining that one or more six dimensional pose hypotheses of the plurality of six dimensional pose hypotheses have not been used to generate model three dimensional point cloud data may enhance computational efficiency by reducing a size of a memory to perform the method 300. To illustrate, as explained above, in a particular embodiment, transformed model three dimensional point cloud data is generated from a number of copies of model three dimensional point cloud data corresponding to a size of a memory of a device on which the method 300 is executed. However, in most practical applications, the number of the plurality of six dimensional pose hypotheses is expected to greatly exceed a size of the memory of a device on which the method 300 is to be executed. Thus, to generate instances of transformed model three dimensional point cloud data from each and every six dimensional pose hypothesis of the plurality of six dimensional pose hypotheses without resorting to use of additional memory or without expanding the memory of the device on which the method 300 is to be executed, the iterative process described at least in the context of block 320 may be advantageous. In this manner, by iteratively executing blocks 308-320 until each and every six dimensional pose hypothesis of the plurality of six dimensional pose hypothesis have been applied to model three dimensional point cloud data, memory can be conserved, since additional copies of model three dimensional point cloud data do not need to be instantiated.

Figure 4A:
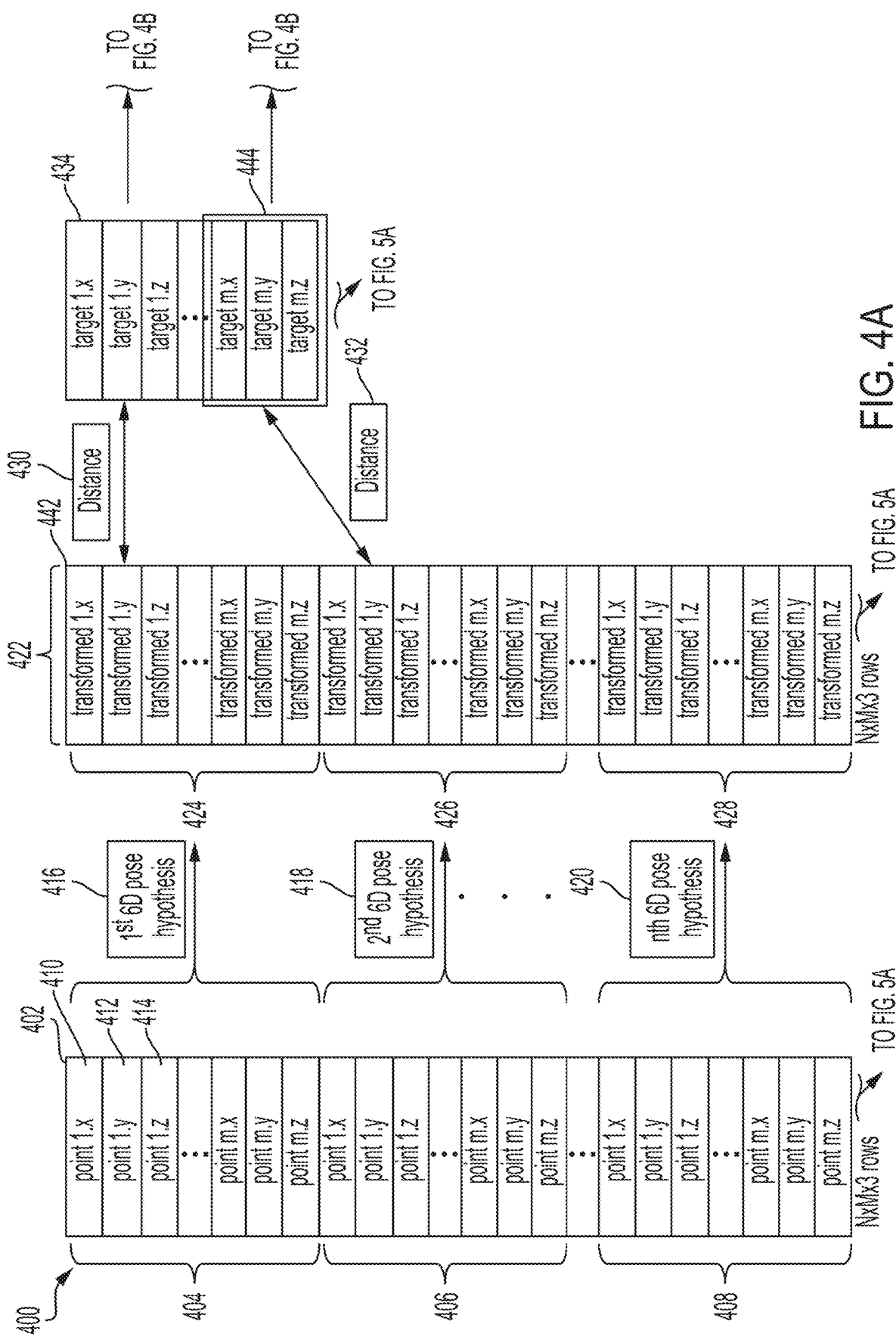
FIGS. 4A and 4B depict an exemplary data structure to implement the exemplary method described in FIGS. 2A, 2B, and FIG. 3.
Figure 4B:
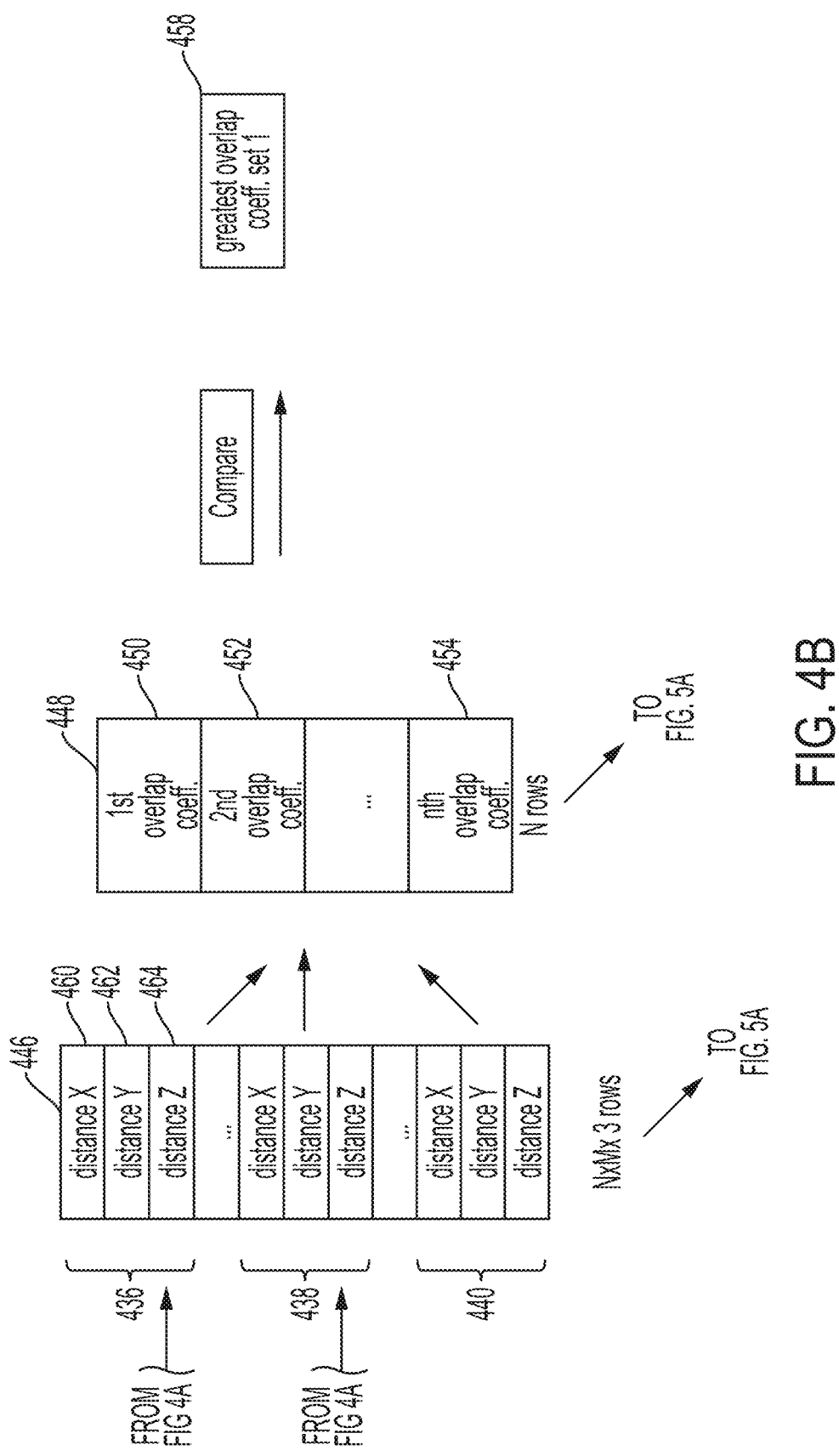

FIGS. 4A and 4B depict an exemplary data structure 400 to implement at least one embodiment of the method 300 in accordance with concepts of the present invention. The data structure 400 of FIG. 4A may be configured to facilitate execution of multiple mathematical operations in parallel to generate transformed model three dimensional point cloud data from which a candidate six dimensional pose hypotheses can be selected from among a plurality of six dimensional candidate pose hypotheses. Thus, the data structure 400 of FIG. 4A may reduce computational time expended to effectuate selection of a correct candidate six dimensional pose hypothesis.

The data structure 400 may be stored in a memory of a computing device that performs the method 400. For instance, the data structure 400 may be stored in memory 124 of FIG. 1B. The data structure 400 may include a first copy of the model three dimensional point cloud data 404 as shown in FIG. 4A. The data structure 400 may further include a second copy of the model three dimensional point cloud data 406, also as shown in FIG. 4A. Moreover, the data structure 400 may include an nth copy of the model three dimensional point cloud data 408 in accordance with FIG. 4A. The first copy of the model three dimensional point cloud data 404, the second copy of the model three dimensional point cloud data 406, and the nth copy of the model three dimensional point cloud data 408 cumulatively may equal a threshold number of copies of the model three dimensional point cloud data. The threshold number of copies of the model three dimensional point cloud data may equal a size of the memory in which the data structure 400 is stored. Alternatively, the threshold number of copies of the model three dimensional point cloud data may be less than the size of the memory in which the data structure 400 is stored. In an embodiment, the first copy of the model three dimensional point cloud data 404, the second copy of the model three dimensional point cloud data 406, and the third copy of the model three dimensional point cloud data 408 may be stored in a first set of memory addresses 402, also referred to as a first container, as shown in FIG. 4A.

In an embodiment, data corresponding to a first coordinate (e.g., an x coordinate of a Cartesian coordinate system) of a point (e.g., a first point) of a copy (e.g., the first copy of the model three dimensional point cloud data 404) of the model three dimensional point cloud data may be stored at a first address 410 in a memory as depicted in FIG. 4A. Data corresponding to a second coordinate (e.g., a y coordinate of the Cartesian coordinate system) of the point (e.g., the first point) of the first copy of the model three dimensional point cloud data 404 may be stored at a second address 412 in the memory in accordance with FIG. 4A. Similarly, data corresponding to a third coordinate (e.g., a z coordinate of the Cartesian coordinate system) of the point (e.g., the first point) of the first copy of the model three dimensional point cloud data 404 may be stored at a third address 414 of the memory as shown in FIG. 4A. In like manner, data corresponding to every coordinate of every point of every copy of the model three dimensional point cloud data may be stored in a particular address of the memory as depicted in FIG. 4A.

In an embodiment, a number of the plurality of six dimensional pose hypotheses (i.e., the plurality of pose hypotheses generated at block 302 of method 300) may be greater than the threshold number of copies of the model three dimensional point cloud data. Thus, six dimensional pose hypotheses may be selected from among the plurality of six dimensional pose hypotheses, where the number of selected six dimensional pose hypotheses may be no greater than the threshold number of copies of the model three dimensional point cloud data. For example, the number of the plurality of six dimensional pose hypotheses may be twice as large as the threshold number of copies (e.g., n copies) of the model three dimensional point cloud data. In such an example, n six dimensional pose hypotheses may be selected from among the 2n plurality of six dimensional pose hypotheses as depicted in FIG. 4. The selected pose hypotheses may referred to as the first set of the plurality of six dimensional pose hypotheses. Multiple instances 424, 426, and 428 of transformed model three dimensional point cloud data 422, as depicted in FIG. 4A, may be generated through mathematical operations performed on each copy of the threshold number of copies of model three dimensional point cloud data using the selected six dimensional pose hypotheses 416, 418, and 420, shown in FIG. 4A.

To illustrate and as depicted in FIG. 4A, a first instance of transformed model three dimensional point cloud data 424 may be generated via mathematical operations performed by a first six dimensional pose hypothesis 416 on the first copy of model three dimensional point cloud data 404. The mathematical operations may consist of multiplying each coordinate of each point of the model three dimensional points comprising the first copy of the model three dimensional point cloud data 404 by a translation matrix corresponding to the first six dimensional pose hypothesis 416 and by a rotation matrix corresponding to the first six dimensional pose hypothesis 416. Multiplying each coordinate of each point of the first copy of the three dimensional point cloud data 404 may transform each coordinate of each point of the first copy of the three dimensional point cloud data 404 into the first instance of transformed model three dimensional point cloud data 424.

In like manner and as show in FIG. 4A, while the first copy of the model three dimensional point cloud data 404 is mathematically operated on by the first six dimensional pose hypotheses 416 to generate the first instance of transformed model three dimensional point cloud data 424, the second copy of the model three dimensional point cloud data 406 may be mathematically operated on by the second six dimensional pose hypothesis 418 to generate a second instance of transformed model three dimensional point cloud data 426. Likewise, each remaining copy (i.e., the n−2 remaining copies) of the model three dimensional point cloud data may be mathematically operated on in parallel by the remain n−2 six dimensional pose hypotheses of the selected plurality of six dimensional pose hypotheses to generate n−2 additional instances of transformed model three dimensional point cloud data. Thus, as depicted n FIG. 4A, m×n×3 rows of transformed model three dimensional points may be generated. The m×n×3 rows of transformed model three dimensional points may comprise the transformed model three dimensional point cloud data 422. The first instance of transformed model three dimensional point cloud data 424 may differ from the second instance of transformed model three dimensional point cloud data 426 and the nth instance of transformed model three dimensional point cloud data 428 in the way in which the points comprising each of the transformed model three dimensional point cloud data 422 have been translated and rotated by each of the selected six dimensional pose hypotheses, such as the first six dimensional pose hypothesis 416, the second six dimensional pose hypothesis 418, and the nth six dimensional pose hypothesis 420. In an example, the transformed model three dimensional point cloud data 422 may be stored in a second set of memory addresses 442, also referred to as a second container, as depicted in FIG. 4A, Distances (e.g., Euclidean distances), such as the distances 430, 432 of FIG. 4A, may be determined between each transformed model three dimensional point of each instance of transformed model three dimensional point cloud data 422 and each target three dimensional point of the target three dimensional point cloud data 434 of FIG. 4A to generate first distance data 436 of FIG. 4B, second distance data 438 of FIG. 4B, and nth distance data 440 of FIG. 4B, which may be stored in a third set of memory addresses 446, also referred to as a third container, as depicted in FIG. 4B. To illustrate, distances, such as the distances 430, 432 of FIG. 4A, may be determined between each transformed model three dimensional point of the first instance of transformed model three dimensional point cloud data 424, show in FIG. 4A, and each target three dimensional point of the target three dimensional point cloud data 434 of FIG. 4A, which may generate the first distance data 436, shown in FIG. 4B. Similarly, distances may be determined between each transformed model three dimensional point of the second instance of transformed model three dimensional point cloud data 426 and each target three dimensional point of the target three dimensional point cloud data 434, which may generate the second distance data 438 of FIG. 4B. In like manner, distances may be determined between each transformed model three dimensional point of the nth instance of transformed model three dimensional point cloud data 428 and each target three dimensional point of the target three dimensional point cloud data 434, which may generate the nth distance data 440 of FIG. 4B. Cumulatively, the first distance data 436, the second distance data 438, and the nth distance data 440 of FIG. 4B may be referred to as the first set of distance data.

In an embodiment, the first set of distance data may be stored in a third set of memory addresses 446, referred to as a third container, and depicted in FIG. 4B. In some embodiments, each distance corresponding to each coordinate may be stored in a particular address of the third set of memory addresses 446. For example, a distance between an x coordinate of a first point of the first instance of transformed model three dimensional point cloud data 424 and a corresponding x coordinate of a point of the target three dimensional point cloud data 434 may be stored in a first address 460 of the third set of memory addresses 446 as shown in FIG. 4B. Likewise a distance between a y coordinate of the first point of the first instance of transformed model three dimensional point cloud data 424 and a corresponding y coordinate of the point of the target three dimensional point cloud data 434 may be stored in a second address 462 of the third set of memory addresses 446 as indicated in in FIG. 4B. In similar manner, a distance between a z coordinate of the first point of the first instance of transformed model three dimensional point cloud data 424 and a corresponding z coordinate of the point of the target three dimensional point cloud data 434 may be stored in a third address 464 of the third set of memory addresses 446, also as depicted in FIG. 4B.

In an alternative embodiment, distance calculations may be only performed between target three dimensional points associated with a particular partition number 444, shown in FIG. 4A, and the transformed model three dimensional points corresponding to the target three dimensional points associated with the particular partition number 444 (i.e., the target three dimensional points located within the partition associated with the partition number) Thus, the number of distance calculations may be reduced and the computational efficiency of the method 300 may be enhanced. In this manner, a candidate six dimensional pose hypothesis may be generated in less time than if distance calculations were to be performed on each target three dimensional point of the target three dimensional point cloud data 434 of FIG. 4A.

Each magnitude of each distance comprising the distance data may be compared against a threshold value. The threshold value may be set by a user of a computing device that may perform the method 300, such as the computing device 110 of FIG. 1B. The threshold value also may be stored in a memory of a computing device that may perform the method 300. If a magnitude of a distance comprising the distance data is less than the threshold value, then an overlap coefficient corresponding to a six dimensional pose hypothesis that generated the corresponding transformed model three dimensional point of an instance of transformed model three dimensional point cloud data may be incremented. To illustrate, if a magnitude of a first distance of the first distance data 436 of FIG. 4B is less than a threshold value, then the first overlap coefficient 450 of FIG. 4B may be incremented. The first overlap coefficient 450 of FIG. 4B may correspond to the first six dimensional pose hypothesis 416 of FIG. 4A. In similar fashion, if a second distance of the second distance data 438 of FIG. 4B is less than the threshold value, then the second overlap coefficient 452 of FIG. 4B corresponding to the second six dimensional pose hypothesis 418 of FIG. 4A may be incremented. Likewise, if a third distance of the nth distance data 440 of FIG. 4B is less than the threshold value, then the nth overlap coefficient 454 of FIG. 4B corresponding to the nth six dimensional pose hypothesis 420 of FIG. 4A may be incremented. In an embodiment, overlap coefficients, such as the first overlap coefficient 450, the second overlap coefficient 452, and the nth overlap coefficient 454, may be stored in a fourth set of memory addresses 448, referred to as a fourth container, as shown in FIG. 4B.

As will be appreciated by a person of skill in the art, overlap coefficients, such as the first overlap coefficient 450, the second overlap coefficient 452, and the nth overlap coefficient 454, all shown in FIG. 4B, may be indicative of how well a six dimensional pose hypothesis, such as the first six dimensional pose hypothesis 416 of FIG. 4A, the second six dimensional pose hypothesis 418 of FIG. 4A, and the nth six dimensional pose hypothesis 420 of FIG. 4A, generate transformed model three dimensional points that overlap with target three dimensional points of the target three dimensional point data 434. For example, if a magnitude of the nth overlap coefficient 454 of FIG. 4B is greater than a magnitude of the first overlap coefficient 450 of FIG. 4B or of the second overlap coefficient 452 of FIG. 4B, then a larger number of transformed three dimensional points of the nth instance of three dimensional point cloud data 428 have distances between points of the target three dimensional point cloud data 434 that are less than the threshold value than target three dimensional points of the first instance of transformed model three dimensional point cloud data 424 or the second instance of transformed model three dimensional point cloud data 426. Thus, overlap coefficients may be used to compare six dimensional pose hypotheses.

In an embodiment, the magnitudes of the overlap coefficients may be compared against one another. For example, a first magnitude of the first overlap coefficient 450, a second magnitude of the second overlap coefficient 452, and a third magnitude of the nth overlap coefficient 454 may be compared against one another as shown in FIG. 4B. A six dimensional pose hypothesis corresponding to the greatest overlap coefficient 458 of the overlap coefficients (e.g., the first overlap coefficient 450, the second overlap coefficient 452, and the nth overlap coefficient 454) may be selected as the potential candidate six dimensional pose hypothesis of the first set of six dimensional pose hypotheses, as indicated in FIG. 4B.

Figure 5A:
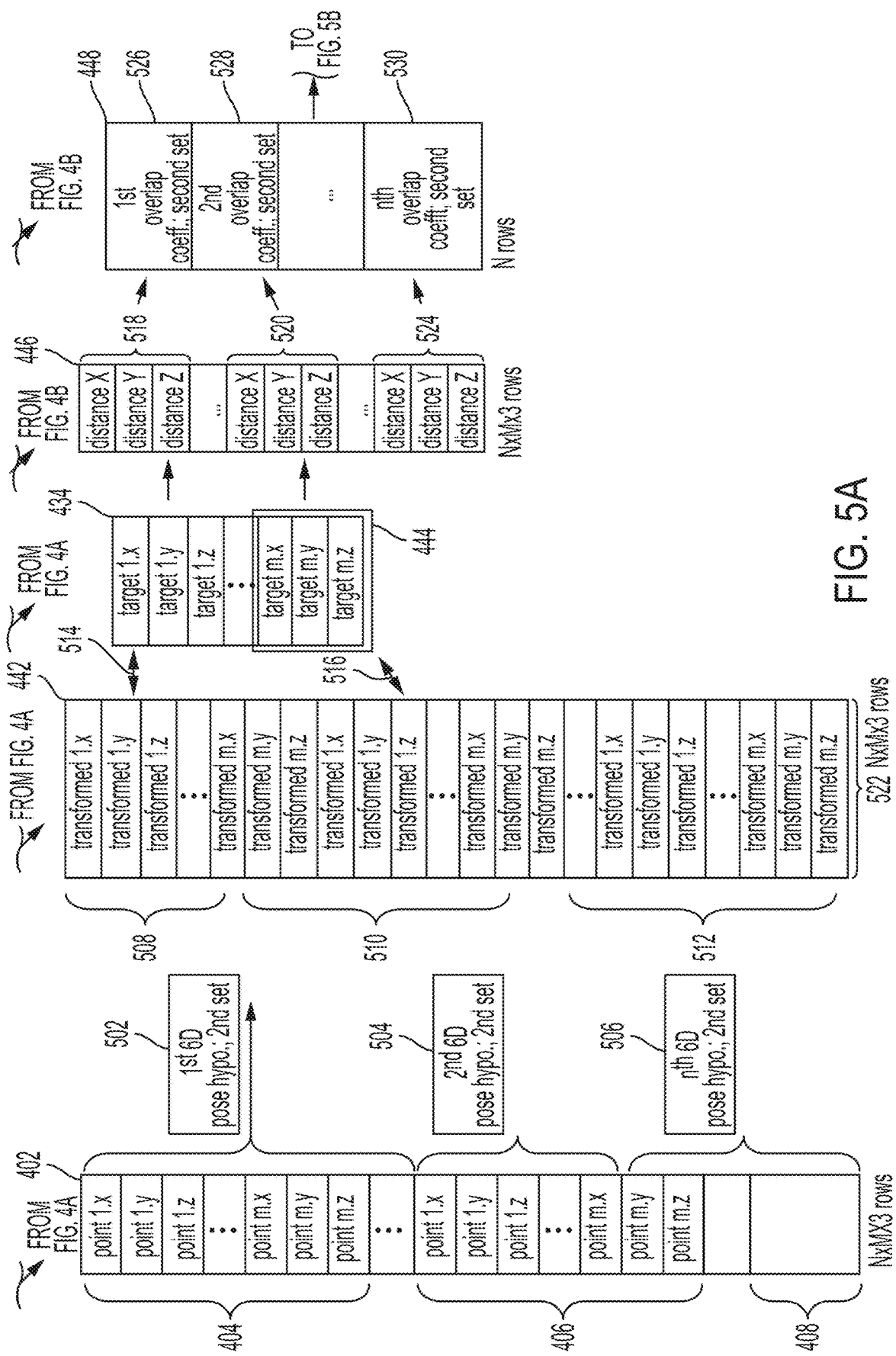
FIGS. 5A and 5B depict use of a data structure to iterate through a second set of six dimensional pose hypotheses according to embodiments of the present invention.
Figure 5B:
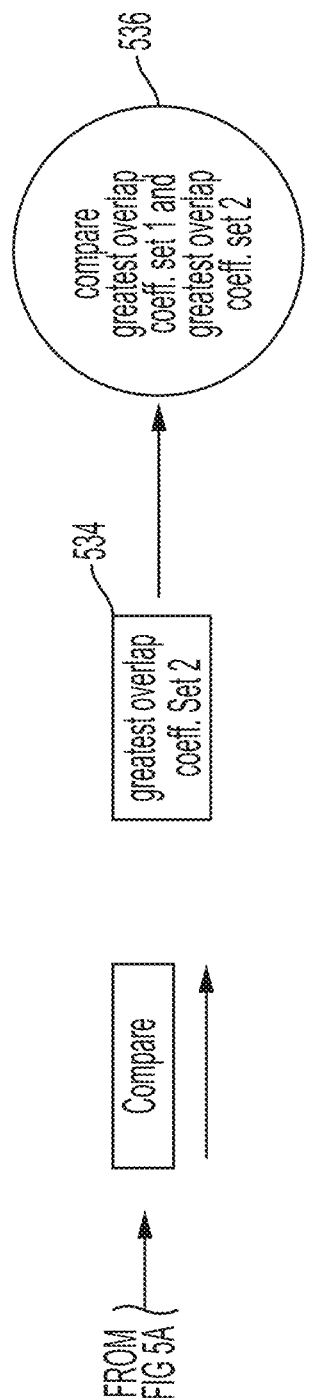

In embodiments, the number of six dimensional pose hypotheses may exceed a size of a memory configured to perform exemplary methods, such as the methods 200 and 300. Yet, evaluating an overlap corresponding to these additional six dimensional pose hypotheses may be advantageous. FIGS. 5A and 5B. depict an embodiment in which model three dimensional points may be operated on iteratively by a second set of six dimensional pose hypotheses, selected from among the plurality of six dimensional pose hypotheses, to accommodate a situation in which a number of six dimensional pose hypotheses exceed a memory size of a device configured to implement exemplary methods 200 and 300.

As depicted in FIG. 5A, the model three dimensional points that may be stored in the first set of memory addresses 402 (i.e., the first container) may be operated on by a second set of six dimensional pose hypotheses. For instance, the first copy of the model three dimensional point cloud data 404 may be operated on by a first six dimensional pose hypotheses of the second set of six dimensional pose hypotheses 502 as depicted in FIG. 5A. Similarly, the second copy of the model three dimensional point cloud data 406 may be operated on in parallel by a second six dimensional pose hypothesis of the second set of six dimensional pose hypotheses 504 as shown in FIG. 5A. In like manner, the nth copy of the model three dimensional point cloud data 408 may be operated on in parallel by an nth six dimensional pose hypothesis of the second set of six dimensional pose hypotheses 506 as indicated in FIG. 5A. Thus, through these parallel operations, a second set of transformed model three dimensional point cloud data 522, shown in FIG. 5A, may be generated. In an embodiment, the second set of transformed model three dimensional point cloud data 522 may be stored in the second set of memory addresses 442 (i.e., the second container) of FIG. 5A. For example, the second set of transformed model three dimensional point cloud data 522 may be overwritten onto the second set of memory addresses 442 by a processor, such as the processor 122 of FIG. 1B.

To explain further, in an embodiment, and in reference to FIG. 5A, a first six dimensional pose hypothesis of the second set of six dimensional pose hypotheses 502 may operate on the first copy of transformed model three dimensional point cloud data 404 to generate a first instance of a second set of transformed model three dimensional point cloud data 508. In parallel, a second six dimensional pose hypothesis of the second set of six dimensional pose hypotheses 504 may operate on the second copy of model three dimensional point cloud data 406 to generate a second instance of a second set of transformed model three dimensional point cloud data 510. Similarly and in parallel, an nth six dimensional pose hypothesis of a second set of six dimensional pose hypotheses 506 may operate on an nth copy of model three dimensional point cloud data 408 to generate an nth instance of a second set of transformed model three dimensional point cloud data 512. In this way, multiple parallel operations occur, thereby reducing a computational time to generate the second set of transformed model three dimensional point cloud data 522 and increasing the speed with which a suitable candidate six dimensional pose hypothesis may be selected.

As in the context of FIG. 4, distances, such as the distances 514, 516 may be calculated between the transformed model three dimensional points of the second set of transformed model three dimensional point cloud data 522 and target three dimensional points of the target three dimensional point cloud data 434. In an embodiment, a second set of distance data may be generated and stored in the third set of memory addresses 446 (i.e., in the third container). For example, the second set of distance data, calculated based on distances between the transformed model three dimensional points of the second set of transformed model three dimensional point cloud data 522 and target three dimensional points of the target three dimensional point cloud data 434, may be overwritten onto the third set of memory addresses 446. In like manner, a second set of first distance data 518, a second set of second distance data 520, and an second set of nth distance data 524 may be generated and stored. Cumulatively, the second set of first distance data 518, the second set of second distance data 520, and the second set of nth distance data 524 may be referred to as the second set of distance data.

Each distance comprising the second set of first distance data 518, the second set of second distance data 520, and the second set of nth distance data 524 may be compared against the threshold value. In like manner as described in FIG. 4, overlap coefficients may be incremented in response to a distance of a second set of distance data being less than the threshold value. Thus, as shown in FIG. 5A, a first overlap coefficient of a second set of overlap coefficients 526, a second overlap coefficient of the second set of overlap coefficients 528, and an nth overlap coefficient of the second set of overlap coefficients 530 may be determined. Cumulatively, the first overlap coefficient of the second set of overlap coefficients 526, the second overlap coefficient of the second set of overlap coefficients 528, and nth overlap coefficient of the second set of overlap coefficients 530 may be referred to as the second set of overlap coefficients. In an embodiment, the first overlap coefficient of the second set of overlap coefficients 526 may correspond to the first six dimensional pose hypothesis of the second set of six dimensional pose hypotheses 502, the second overlap coefficient of the second set of overlap coefficients 528 may correspond to the second six dimensional pose hypothesis of the second set of six dimensional pose hypotheses 504, and the nth overlap coefficient of the second set of overlap coefficients 530 may correspond to an nth six dimensional pose hypothesis of the second set of six dimensional pose hypotheses 506. In an example, the second set of overlap coefficients may be stored in the fourth set of memory addresses 448 (i.e., the fourth container). For instance, a processor, such as the processor 122 of FIG. 1B may overwrite the fourth set of memory addresses 448 with the second set of overlap coefficients as shown in FIG. 5A.

As depicted in FIG. 5B, magnitudes of the second set of overlap coefficients may be compared and the greatest overlap coefficient of the second set of overlap coefficients may be identified. The six dimensional pose hypothesis corresponding to the greatest overlap coefficient of the second set of overlap coefficients 534 may be selected as the potential candidate six dimensional pose hypothesis of the second set of six dimensional pose hypotheses in accordance with FIG. 5B. Thereafter and as depicted in FIG. 5B at 536, a magnitude of the greatest overlap coefficient 458 and the greatest overlap coefficient of the second set of overlap coefficients 534 may be compared. The potential six dimensional pose hypothesis corresponding to the greatest overlap coefficient (i.e., the greatest overlap coefficient between the greatest overlap coefficient 458 and the greatest overlap coefficient of the second set of overlap coefficients 534) may be selected as the candidate six dimensional pose hypothesis as indicated in FIG. 5B.

FIGS. 6A and 6B describe a method 600 that may be used to generate a plurality of six dimensional pose hypotheses in particular embodiments of the invention. As explained below, the method 600 may identify pairs of local points on a surface of a three dimensional representation of an object to be identified. The method 600 may align the pair of points with reference points selected from an image of the object. In this way, the method 600 may be used to generate a plurality of six dimensional pose hypotheses.

At block 602, model three dimensional point pairs 602A, 604A, as depicted in FIG. 6B, that are positioned on a surface 608A of a three dimensional representation of a particular object corresponding to the model three dimensional point cloud data may be selected. At block 604, feature vectors may be determined that correspond to the model three dimensional point pairs 602A, 604A. A feature vector may comprise a Euclidean distance of a line 610A, as shown in FIG. 6B, connecting a first point m1 and a second point m2 of a model three dimensional point pair, such as the pair 602A (a distance component). The feature vector additionally may include a first measure of a first angle 612A, as shown in FIG. 6B, between the line 610A and first normal vector n1 associated with the first point m1 (a first angle component). Moreover, the feature vector may include a second measure of a second angle 614A between the second vector n2 associated with the second point m2 and the line 610A (a second angle component). A final component of the feature vector may be a measure of an angle 616A, as depicted in FIG. 6B, between the first vector n1 and the second vector n2 (a third angle component).

At block 606, a reference target three dimensional point pair having a feature vector similar to the feature vector of the model three dimensional point pair may be selected from among target three dimensional points of the target three dimensional point cloud data. Feature vectors may be deemed to be similar if their components have similar values within established thresholds that can be set by a user, such as user of the system 100 of FIGS. 1A and 1B. For instance, a first feature vector is similar to a second feature vector if magnitudes of their distance components, first angle components, second angle components, and third angle components are substantially the same within a threshold established by a user of the system 100 of FIGS. 1A and 1B.

At block 608, the reference target three dimensional point pair may be aligned with the model three dimensional point pair. At block 610, other model three dimensional point pairs (e.g., the pair 604A) may be aligned with the reference target three dimensional point pair. In particular, the coordinates of the other model three dimensional point pairs may be multiplied by a translation matrix and a rotation matrix to orient the other model three dimensional point pairs into the coordinate system of the reference target three dimensional point pair. The translation matrix and the rotation matrix may constitute a six dimensional pose hypothesis. In this manner, various model three dimensional point pairs and various reference target three dimensional point pairs may be identified and aligned. The respective translation and rotation matrices used to align points may constitute additional six dimensional pose hypotheses. Hence, a plurality of pose hypotheses may be generated. Although FIGS. 6A and 6B describe a particular method 600 to generate pose hypotheses, other methods known in the art may be used.

Figure 7:
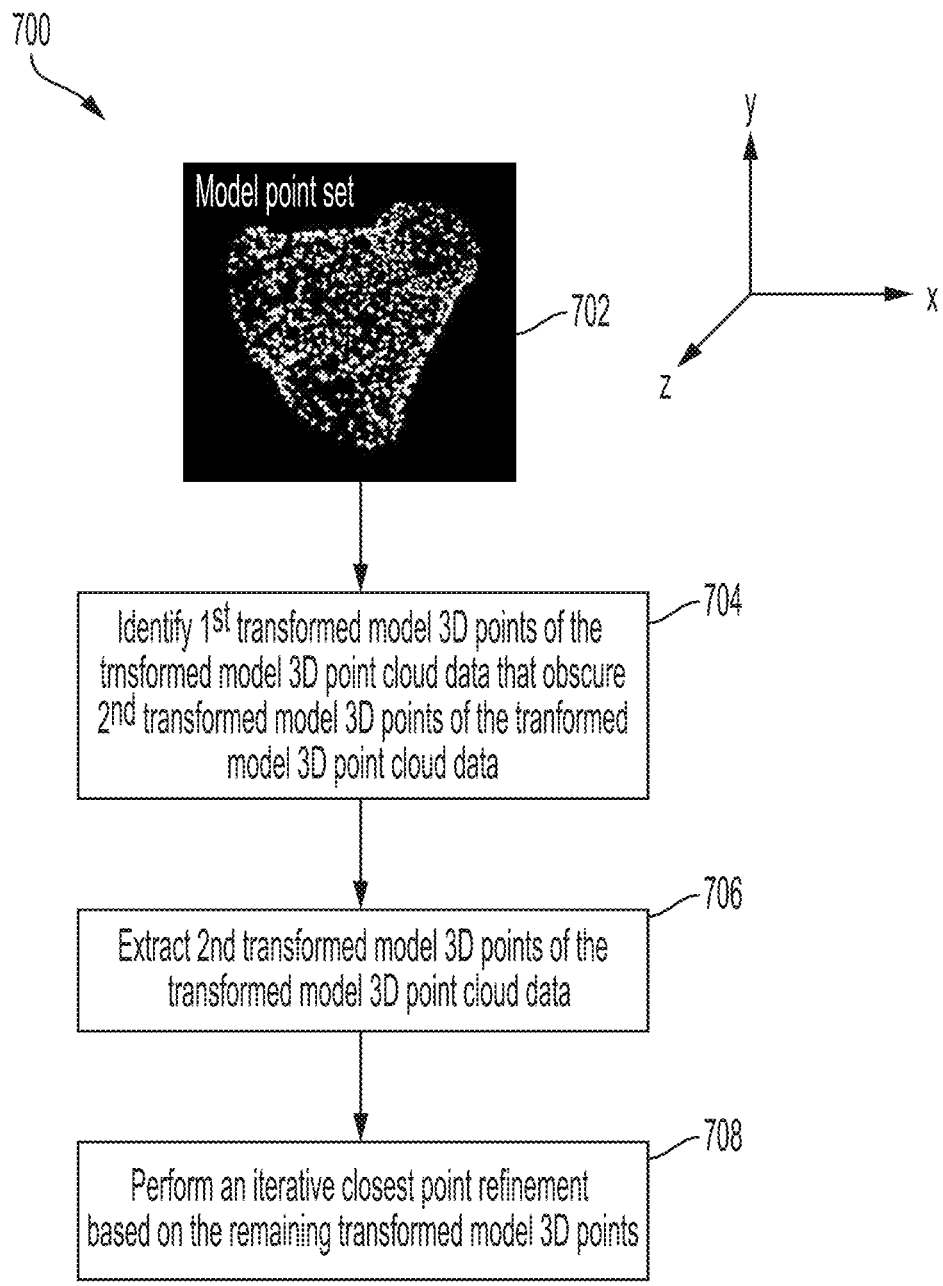
FIG. 7 is a flowchart depicting an exemplary method for refining a candidate pose hypothesis according to embodiments of the present invention.

FIG. 7 describes an exemplary method 700 for refining a candidate six dimensional pose hypothesis, according to a particular embodiment of the invention. As described below, certain transformed model three dimensional points of the candidate six dimensional pose hypothesis may be obscured by other transformed model three dimensional points of the candidate six dimensional pose hypothesis. These obscured transformed model three dimensional points may be extracted from model three dimensional point cloud data of the candidate six dimensional pose hypothesis when provided as an input to an iterative closest point (ICP) algorithm for further refinement. By removing obscured transformed three dimensional points, fewer computational resources are need to perform the ICP. Additionally, an accuracy and a precision of the refined candidate six dimensional pose hypothesis are enhanced.

The model three dimensional points of the model three dimensional point cloud data are translated and rotated in accordance with the translation and rotation matrices associated with the candidate six dimensional pose hypothesis to produce transformed model three dimensional points and transformed model three dimensional point cloud data. However, certain of the transformed model three dimensional points associated with the candidate six dimensional pose hypothesis might obscure other transformed model three dimensional points associated with the candidate six dimensional pose hypothesis as depicted in the transformed model three dimensional point cloud data 702 associated with a candidate six dimensional pose hypothesis. For example, transformed model three dimensional points of the transformed model three dimensional point cloud data 702 that are in the positive z direction of the coordinate system included in FIG. 7 obscure or hide transformed model three dimensional points of the transformed model three dimensional point cloud data 702 that are in the negative z direction of the coordinate system included in FIG. 7.

Thus, at block 704, first transformed model three dimensional points of the transformed model three dimensional point cloud data that obscure second transformed model three dimensional points of the transformed model three dimensional point cloud data may be identified based on their coordinates relative to the known coordinate system of the imaging device, such as the imaging device 114 of FIG. 1A. At block 706, the second transformed model three dimensional points of the transformed model three dimensional point cloud data (i.e., the obscured transformed model three dimensional points) may be extracted, leaving first transformed model three dimensional points. At block 708, an iterative closest point (ICP) refinement may be performed based on the remaining transformed model three dimensional points (i.e., the first transformed model three dimensional points). In this manner, the candidate six dimensional pose hypothesis may be refined without incurring the additional computational costs of performing an ICP refinement on the second transformed model three dimensional points obscured by the first transformed model three dimensional points. Since the obscured transformed model three dimensional points may be irrelevant (i.e., their inclusion in the ICP refinement would not enhance the candidate six dimensional pose hypothesis), the obscured model three dimensional points may be removed to conserve computational resources. Additionally, an accuracy and a precision of the refined candidate six dimensional pose hypothesis may be enhanced through application of the method 700.

The process shown or described in any of the systems of FIGS. 1A and 1B, the methods of FIGS. 2A-1, 2A-2 2B-1, 2B-2, 3, 6A, 6B, and 7, the data structures of FIGS. 4A, 4B, 5A, and 5B, or a combination thereof, may be controlled by a processing unit such as a central processing unit (CPU), a controller, a field-programmable gate array (FPGA) device, an application-specific integrated circuit (ASIC), another hardware device, firmware device, or any combination thereof. As an example, any of the systems of FIGS. 1A and 1B, the methods of FIGS. 2A-1, 2A-2, 2B-1, 2B-2, 3, 6A, 6B, and 7, the data structures of FIGS. 4A, 4B, 5A, and 5B, or a combination thereof, can be performed by one or more processors that perform object recognition. Additionally, a first portion of one of the processes described in the system of FIGS. 1A and 1B, the methods of FIGS. 2A-1, 2A-2, 2B-1, and 2B-2, 3, 6A, 6B, or 7, or the data structures of FIGS. 4A, 4B, 5A, and 5B may be combined with at least a second portion of another one of the processes described in the system of FIGS. 1A and 1B, the methods of FIG. 2A-1, 2A-2, 2B-1, 2B-2, 3, 6A, 6B, or 7, and the data structures of FIGS. 4A, 4B, 5A, and 5B. For example, a first portion of the method 300 of FIG. 3 may be combined with a second portion of the method 700 of FIG. 7.

Although one or more of FIGS. 1-7 may illustrate systems, apparatuses, data structures, methods, or a combination thereof, according to the teachings of the disclosure, the disclosure is not limited to these illustrated systems, apparatuses, methods, or a combination thereof. One or more functions or components of any of FIGS. 1-7 s illustrated or described herein may be combined with one or more other portions of another function or component of FIGS. 1-7 Accordingly, no single implementation described herein should be construed as limiting and implementations of the disclosure may be suitably combined without departing from the teachings of the disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm blocks described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIG. 1 may include processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for selecting a six dimensional pose hypothesis from a plurality of six dimensional pose hypotheses, the method comprising:
    transforming model three dimensional point cloud data into a plurality of transformed model three dimensional point cloud data instances using a plurality of six dimensional pose hypotheses, wherein the model three dimensional point cloud data is derived from a three dimensional representation of an object to be identified in an image of a plurality of objects, and wherein the plurality of transformed model three dimensional point cloud data instances are transformed from the model three dimensional point cloud data in parallel;

repeating one or more iterations of the transforming model three dimensional point cloud data into the plurality of transformed model three dimensional point cloud data instances using the plurality of six dimensional pose hypotheses based on determining that model three dimensional point cloud data have not been transformed by one or more six dimensional pose hypotheses of the plurality of six dimensional pose hypotheses; and selecting a candidate six dimensional pose hypothesis from among the plurality of six dimensional pose hypotheses based on an extent to which a transformed model three dimensional point cloud data instance generated by the candidate six dimensional pose hypothesis overlaps with target three dimensional points of target three dimensional point cloud data derived from the image of the plurality of objects.

2. The method of claim 1, wherein the transforming model three dimensional point cloud data into a plurality of transformed model three dimensional point cloud data instances using a plurality of six dimensional pose hypotheses comprises transforming each model three dimensional point of each copy of the model three dimensional point cloud data into a transformed model three dimensional point of a transformed model three dimensional point cloud data instance of the plurality of transformed model three dimensional point cloud data instances in parallel, and wherein each transformed model three dimensional point cloud instance comprises model three dimensional points of the model three dimensional point cloud data that have been translated and rotated by translation and rotation matrices corresponding to each six dimensional pose hypothesis of the plurality of six dimensional pose hypotheses.

3. The method of claim 1, wherein the transforming model three dimensional point cloud comprises performing parallel mathematical operations on the model three dimensional point cloud data, wherein each six dimensional pose hypothesis of the plurality of six dimensional pose hypotheses corresponds to a particular set of mathematical operations.

4. The method of claim 1, the method further comprising:
determining a plurality of overlap metrics between transformed model three dimensional points of each transformed model three dimensional point cloud instance and target three dimensional points of the target three dimensional point cloud data;
identifying the overlap metric having a largest magnitude among the plurality of the overlap metrics; and
selecting a six dimensional pose hypothesis from among the plurality of six dimensional pose hypothesis corresponding to the overlap metric having the largest magnitude, wherein the selected six dimensional pose hypothesis comprises the candidate six dimensional pose hypothesis.

5. The method of claim 4, wherein the determining the plurality of overlap metrics comprises determining a distance between transformed model three dimensional points of a transformed model three dimensional point cloud data instance and target three dimensional points of the target three dimensional point cloud data.

6. The method of claim 5, the method further comprising:
partitioning the target three dimensional point cloud data;
assigning a unique partition number to each partition of the partitioned target three dimensional point cloud data; and
determining the distance between the transformed model three dimensional points of the transformed model three dimensional point cloud instance and target three dimensional points corresponding to the unique partition number based, at least in part, on a location of the transformed model three dimensional points within a partition.

7. The method of claim 1, the method further comprising:
after the selecting the candidate six dimensional pose hypothesis, refining the candidate six dimensional pose hypothesis through extraction of obscured transformed model three dimensional points corresponding to the transformed model three dimensional point cloud instance associated with the candidate six dimensional pose hypothesis; and
performing an iterative closest point (ICP) algorithm on the transformed model three dimensional points of the transformed model three dimensional point cloud instance corresponding to the candidate six dimensional pose hypothesis and target three dimensional points of the target three dimensional point data.

8. The method of claim 1, the method further comprising sending candidate six dimensional pose hypothesis data corresponding to the candidate six dimensional pose hypothesis to a robot, wherein the robot is configured to identify the object based on the candidate six dimensional pose hypothesis data.

9. The method of claim 1, the method further comprising storing one or more copies of the model three dimensional point cloud data in a one dimensional array to facilitate the transforming the model three dimensional point cloud data into the plurality of the transformed model three dimensional point cloud data instances.

10. A device for selecting a six dimensional pose hypothesis from among a plurality of six dimensional pose hypotheses, the device comprising:
a memory configured to store:
model three dimensional point cloud data corresponding to a three dimensional representation of an object to be identified from an image of a plurality of objects,
six dimensional pose hypotheses data corresponding to a plurality of six dimensional pose hypotheses, and
target three dimensional point cloud data corresponding to the image; and
a processor configured to:
generate a plurality of transformed model three dimensional point cloud data instances through parallel performance of mathematical operations on the model three dimensional point cloud data, the mathematical operations corresponding to the six dimensional pose hypotheses data; determine a plurality of overlap metrics, each overlap metric of the plurality of overlap metrics corresponding to each transformed model three dimensional point cloud data instance, the overlap metric indicative of an extent of overlap between transformed model three dimensional points of a transformed model three dimensional point cloud instance and target model three dimensional points of target model three dimensional point cloud data; and select as a candidate six dimensional pose hypothesis the six dimensional candidate pose hypotheses corresponding to a largest overlap metric of the plurality of overlap metrics.

11. The device of claim 10, wherein each six dimensional pose hypothesis of the plurality of six dimensional pose hypotheses corresponds to a particular translation matrix and to a particular rotation matrix, and wherein the six dimensional pose hypotheses data corresponds to a plurality of particular translation matrices and particular rotation matrices.

12. The device of claim 11, wherein the processor configured to determine the plurality of overlap metrics further comprises the processor configured to:
determine distances between target three dimensional points of the target three dimensional point cloud data and transformed model three dimensional points of each transformed model three dimensional point cloud data instance;
compare a distance of the distances against a threshold value stored in the memory; and
in response to the distance being less than the threshold value, increment a variable stored in the memory, the variable corresponding to an overlap metric.

13. The device of claim 12, wherein the processor is further configured to:
compare a magnitude of each overlap metric of the plurality of overlap metrics; and
identify the overlap metric having the largest magnitude as the largest overlap metric.

14. The device of claim 11, further comprising:
an imaging device configured to generate a three dimensional image of the plurality of objects; and
a network interface configured to send candidate six dimensional pose hypothesis data corresponding to the candidate six dimensional pose hypothesis to a second device, wherein the candidate six dimensional pose hypothesis data is configured to cause the second device to identify the object from the image of the plurality of objects.

15. The device of claim 14, wherein the second device is a robot, and wherein the six dimensional pose hypothesis data, combined with control instructions, is further configured to cause the robot to grasp the object.

16. The device of claim 10, further comprising a mechanical arm configured to grasp the object based, at least in part on, candidate six dimensional pose hypothesis data corresponding to the candidate six dimensional pose hypothesis.

17. A non-transitory computer readable medium comprising instructions that, when executed by a processor, cause the processor to:
generate a plurality of transformed model three dimensional point cloud data instances through parallel performance of mathematical operations on model three dimensional point cloud data stored in a one dimensional array, each mathematical operation of the mathematical operations corresponding to a six dimensional pose hypothesis of a plurality of six dimensional pose hypotheses, wherein the model three dimensional point cloud data is extracted from a three dimensional representation of an object to be identified; and
select a candidate six dimensional pose hypothesis from among the plurality of six dimensional pose hypotheses, wherein the candidate six dimensional pose hypotheses is selected based on an overlap metric.

18. The non-transitory computer readable medium of claim 17, wherein the instructions further cause the processor to determine a plurality of overlap metrics, each overlap metric of the plurality of overlap metrics indicative of an extent of overlap between transformed model three dimensional points of each transformed model three dimensional point cloud data instance of the plurality of transformed model three dimensional point cloud data instances and target three dimensional points of target three dimensional point cloud data extracted from an image of a plurality of objects.

19. The non-transitory computer readable medium of claim 18, wherein the target three dimensional points correspond to a partition number of partitions imposed on the target three dimensional point cloud data, and wherein the instructions further cause the processor to partition the target three dimensional point cloud data.

20. The non-transitory computer readable medium of claim 17, wherein the instructions further cause the processor to position and to orient a mechanical arm of a device to grasp the object.

* * * * *